United States Patent
Hirakata et al.

(10) Patent No.: US 10,264,154 B2
(45) Date of Patent: Apr. 16, 2019

(54) DISPLAY CONTROL SYSTEM

(71) Applicants: Satoru Hirakata, Tokyo (JP); Kenichi Takeda, Kanagawa (JP)

(72) Inventors: Satoru Hirakata, Tokyo (JP); Kenichi Takeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/001,394

(22) Filed: Jun. 6, 2018

(65) Prior Publication Data
US 2019/0007575 A1    Jan. 3, 2019

(30) Foreign Application Priority Data
Jun. 28, 2017    (JP) .................................. 2017-126439

(51) Int. Cl.
*H04N 1/00* (2006.01)
*G06F 3/12* (2006.01)

(52) U.S. Cl.
CPC ....... *H04N 1/00973* (2013.01); *G06F 3/1204* (2013.01); *G06F 3/1225* (2013.01); *G06F 3/1232* (2013.01); *H04N 1/00244* (2013.01); *H04N 1/00411* (2013.01); *H04N 1/00413* (2013.01); *H04N 1/00464* (2013.01); *H04N 2201/0094* (2013.01)

(58) Field of Classification Search
CPC .......................... H04N 1/00973; G06F 3/1204
See application file for complete search history.

(56) References Cited

U.S. PATENT DOCUMENTS

| | | |
|---|---|---|
| 2007/0279667 A1 | 12/2007 | Hattori et al. |
| 2007/0280118 A1 | 12/2007 | Takahashi et al. |
| 2008/0010306 A1* | 1/2008 | Nagai .................... G03G 15/55 |
| 2008/0043283 A1 | 2/2008 | Takeda |
| 2009/0260079 A1* | 10/2009 | Anbo .................. G06F 17/3089 726/22 |
| 2011/0134481 A1 | 6/2011 | Nagai et al. |

(Continued)

FOREIGN PATENT DOCUMENTS

| | | |
|---|---|---|
| JP | 2008-011500 | 1/2008 |
| JP | 2008-242660 | 10/2008 |

(Continued)

*Primary Examiner* — Ibrahim Siddo
(74) *Attorney, Agent, or Firm* — Oblon, McClelland, Maier & Neustadt, L.L.P.

(57) ABSTRACT

A system includes a server to distribute one or more applications and an image processing apparatus communicable with the server. The server includes circuitry. The circuitry receives information relating to a device type of the image processing apparatus from the image processing apparatus. The circuitry changes, based on the received information relating to the device type, a part of a screen design relating to an application list screen. The circuitry transmits, to the image processing apparatus, information relating to the application list screen in which the part of the screen design is changed based on the information relating to the device type. The browser executes an application command for transmitting the information relating to the device type to the server. The browser displays the application list screen in which the part of the screen design is changed based on the information relating to the device type.

12 Claims, 29 Drawing Sheets

(56) References Cited

U.S. PATENT DOCUMENTS

| | | |
|---|---|---|
| 2014/0268208 A1 | 9/2014 | Hirakata |
| 2014/0337928 A1 | 11/2014 | Hirakata et al. |
| 2015/0095988 A1 | 4/2015 | Hirakata |
| 2015/0161407 A1 | 6/2015 | Hirakata |
| 2015/0205510 A1 | 7/2015 | Hirakata |
| 2016/0112395 A1 | 4/2016 | Hirakata et al. |
| 2018/0020110 A1 | 1/2018 | Hirakata et al. |

FOREIGN PATENT DOCUMENTS

| | | |
|---|---|---|
| JP | 2012-014287 | 1/2012 |
| JP | 2012-058853 | 3/2012 |
| JP | 2013-101632 | 5/2013 |
| JP | 2015-005196 | 1/2015 |
| JP | 2015-138513 | 7/2015 |
| JP | 2016-192238 | 11/2016 |

\* cited by examiner

FIG. 5

| MODEL ID | MODEL NAME | MODEL CODE |
|---|---|---|
| M001 | Machine-001 | 3F08 |
| M002 | Machine-002 | 4G12 |
| M003 | Machine-003 | 5R33 |

FIG. 6

| APPLICATION ID | MODEL CODE | VERSION INFORMATION | REQUIRED HARDWARE | UI LANGUAGE |
|---|---|---|---|---|
| S001 | 3F08 | 1.0 | FINISHER | |
| S002 | 3F08 | 1.1 | | ENGLISH |
| S003 | 3F08 | 2.0 | HUMAN DETECTION SENSOR | |

FIG. 7

| APPLICATION ID | STATUS INFORMATION |
|---|---|
| S001 | PUBLICLY AVAILABLE |
| S002 | PUBLICLY AVAILABLE |
| S003 | PUBLICLY AVAILABLE |
| S004 | PUBLICLY AVAILABLE |
| S005 | PUBLICLY NOT AVAILABLE |
| S006 | PUBLICLY AVAILABLE |
| S007 | PUBLICLY NOT AVAILABLE |
| S008 | PUBLICLY AVAILABLE |
| S009 | PUBLICLY AVAILABLE |

FIG. 8

APPLICATION DESCRIPTION INFORMATION

| APPLICA-TION ID | LANGUAGE INFORMATION | DISPLAYED NAME | MESSAGE |
|---|---|---|---|
| S001 | JAPANESE | かんたんコピー | 手軽にコピーができます |
| S001 | ENGLISH | Easy Copier | You can copy easily |
| S002 | JAPANESE | OCRアプリ | テキスト文書に対してOCRを実施できます |
| S002 | FRENCH | OCR app | Vous pouvez effectuer l' OCR pour les documents texte |
| S003 | JAPANESE | 翻訳アプリ | 5言語に翻訳できます |

| APPLICATION NAME (ID) | NUMBER OF DOWNLOADS | | |
|---|---|---|---|
| | MFP | PRINTER | OTHERS |
| Scan App 1 (0x0001) | 3500 | 0 | 3500 |
| Scan App 2 (0x0002) | 3200 | 0 | 3200 |
| Print App (0x0003) | 2000 | 3500 | 5500 |
| Scan App 3 (0x0004) | 2500 | 0 | 2500 |
| QRCode Print App (0x0005) | 100 | 5000 | 5100 |
| BarcordCode Print App (0x0006) | 1000 | 6000 | 7000 |
| Scan OCR App (0x0007) | 600 | 0 | 600 |

FIG. 15
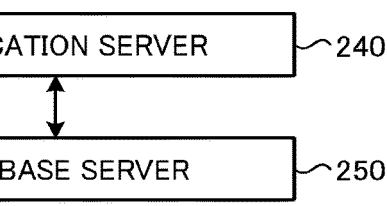
FIG. 16
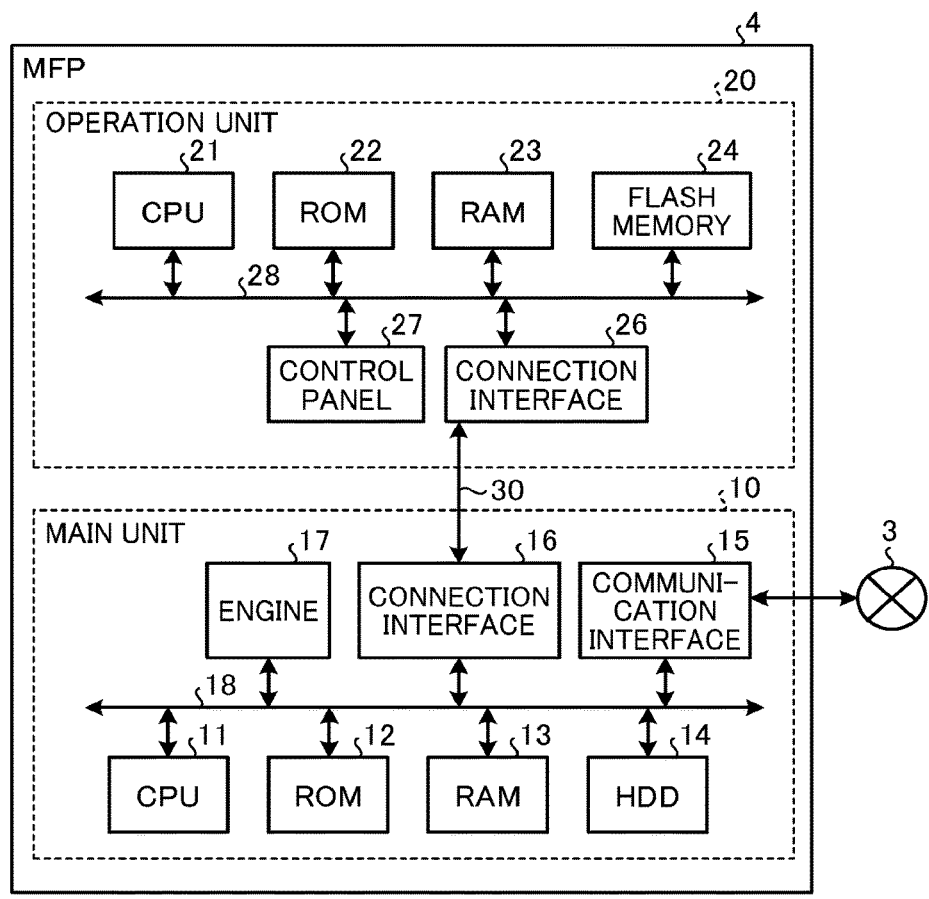

```
{
"total_results":3
, "results":[
    {
    "application_id":"1"
    , "application_name":"application 1"
    , "description":"description 1"
    , "description_detail":"detailed description 1"
    , "version":"1.0"
    , "warnings":[
        {
        "id":4
        , "name":"UI language"
        , "warnigs_options":[
            "ui_english"
            , "ui_spanish"
        ]
        },{
        "id":6
        , "name":"others"
        , "warnings_options":[]
        }
    ]
    },{
    "application_id":"2"
    , "application_name":"application 2"
    , "description":"description 2"
    , "description_detail":"detailed description 2"
    , "version":"1.00"
    , "warnings":[
```

FIG. 21B

```
{
  "application_id":"3",
  "application_name":"application 3",
  "description":"description 3",
  "description_detail":"detailed description 3",
  "version":"1.00",
  "categories":[
    {
      "id":"5",
      "name":"peripheral device",
      "warnigs_options":[
        "camera",
        "usb_memory"
      ]
    },
    {
      "id":"6",
      "name":"others",
      "warnings_options":[]
    }
  ]
},
{
  "id":"6",
  "name":"others",
  "warnings_options":[]
}
```

FIG. 22

```
{
    "total_results":20
    ,"results":[
        {
            "warning_id":"ui_japanese"
            ,"warning_message":"Not Support Japanese"
        }
        ,       {
            "warning_id":"ui_english"
            ,"warning_message":"Not Support English"
        }
        :
        <OMITTED>
        :
        ,{
            "warning_id":"camera"
            ,"warning_message":"Camera App"
        }
        ,{
            "warning_id":"usb_memory"
            ,"warning_message":"USB Memory App"
        }
    ]
}
```

FIG. 23

```
{
    "total_results":2
    ,"results":[
        {
            "setting_id":"ui_japanese"
            ,"setting_name":"UI Japanese"
        }
        ,{
            "setting_id":"camera"
            ,"setting_name":"Camera"
        }
    ]
}
```

DISPLAY CONTROL SYSTEM

CROSS-REFERENCE TO RELATED APPLICATION

This patent application is based on and claims priority pursuant to 35 U.S.C. § 119(a) to Japanese Patent Application No. 2017-126439, filed on Jun. 28, 2017, the entire disclosure of which are hereby incorporated by reference herein.

BACKGROUND

Technical Field

The present disclosure relates to a display control system.

Description of the Related Art

Conventionally, for image processing apparatuses such as multifunction peripherals, a technique is known that installs additional applications onto a control panel that receives a user operation related to a plurality of application functions (copier function, scanner function, printer function, facsimile function, etc.) executable by the image processing apparatus. The installation of additional applications adds functions to the image processing apparatus.

On the other hand, a website (application site) that introduces these additional applications is developed, to promote the use of these applications. A user selects a desired application from the application site displayed at the image processing apparatus to install the selected application. Thus, the application is added to the image processing apparatus.

SUMMARY

A system includes a server configured to distribute one or more applications and an image processing apparatus communicable with the server via a network. The image processing apparatus includes a browser. The server includes circuitry. The circuitry receives information relating to a device type of the image processing apparatus from the image processing apparatus. The circuitry changes based on the received information relating to the device type, a part of a screen design relating to an application list screen displaying the one or more applications distributable to the image processing apparatus on the browser of the image processing apparatus. The circuitry transmits, to the image processing apparatus, information relating to the application list screen in which the part of the screen design is changed based on the information relating to the device type. The browser of the image processing apparatus executes an application command for transmitting the information relating to the device type of the image processing apparatus to the server. The browser of the image processing apparatus displays the application list screen in which the part of the screen design is changed based on the information relating to the device type.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 illustrates an example data structure of first correspondence information, according to an embodiment of the present disclosure;

FIG. 6 illustrates an example data structure of second correspondence information, according to an embodiment of the present disclosure;

FIG. 7 illustrates an example data structure of third correspondence information, according to an embodiment of the present disclosure;

FIG. 8 illustrates an example data structure of fourth correspondence information, according to an embodiment of the present disclosure;

FIG. 11 illustrates an example data structure of a table storing the number of downloads of applications for each device type, according to an embodiment of the present disclosure;

FIG. 15 is a diagram illustrating a variation of the server, according to an embodiment of the present disclosure;

FIG. 16 is a block diagram illustrating an example of a hardware configuration of a multifunction peripheral (MFP), according to an embodiment of the present disclosure;

FIGS. 21A and 21B are a diagram illustrating a response example of an application list, according to an embodiment of the present disclosure;

FIG. 22 is diagram illustrating a response example of a warning list, according to an embodiment of the present disclosure;

FIG. 23 is diagram illustrating an example of a response, which is received as a response to a request for checking settings or specifications of the MFP, according to an embodiment of the present disclosure;

Figure 1:
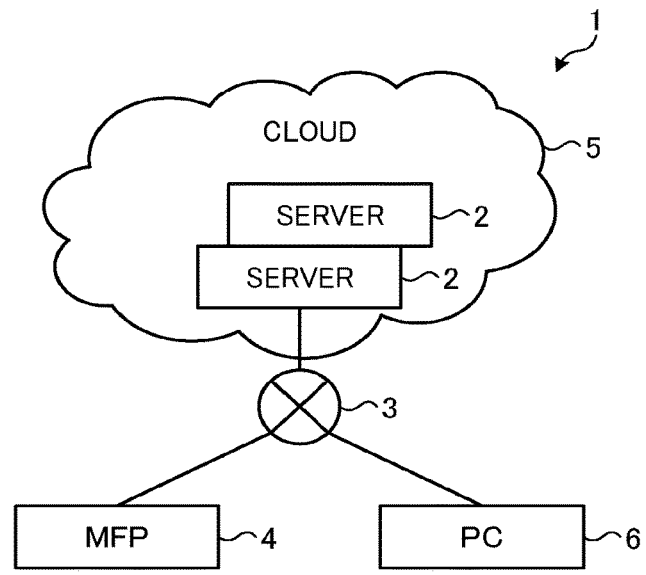
FIG. 1 is a diagram illustrating an example of a configuration of a system, according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a detailed description is given of an embodiment of a server, a system, and an information processing method, with reference to drawings. In the following, a description is given of an example in which a device included in the system is a multifunction peripheral (MFP), which is one example of an image processing apparatus. However, the present disclosure is not limited to the example. Note that the MFP is a device having a plurality of different functions such as a copier function, a scanner function, a printer function, and a facsimile function.

FIG. 1 is a diagram illustrating an example of a configuration of a system (information processing system) 1, according to an embodiment of the present disclosure. The system 1 implements a cloud computing type service.

As illustrated in FIG. 1, the system 1 includes a cloud 5 and an MFP 4 connected to the cloud 5 via a network 3 such as the Internet or a corporate intranet. The cloud 5 includes a server apparatus group configured by a plurality of servers 2. The number of the servers 2 illustrated in FIG. 1 is one example, and the number of servers 2 to be used is not limited to this example. In the example of FIG. 1, only one MFP 4 is illustrated as an image processing apparatus, which is included in the system 1 as a client from a perspective of the cloud 5. However, the number and type of devices included in the system 1 are not limited to this example, and any suitable number and type of devices will suffice. In addition, the system 1 includes a personal computer (PC) 6 used by a user. The PC 6 serves as a client via the network 3. Note that the PC 6 may be any information processing apparatus. Examples of the information processing apparatus include a smartphone and a tablet terminal. The PC 6 includes a browser used for connection to the server 2.

In response to a request from the MFP 4, the server 2 transmits web content data to the MFP 4. The web content data includes display information and screen information. The display information includes information indicating an application that the MFP 4 can use. The screen information includes at least an application command indicating a command to cause the MFP 4 to execute a process related to the application. A description is given below of a detailed configuration of the server 2.

Figure 2:
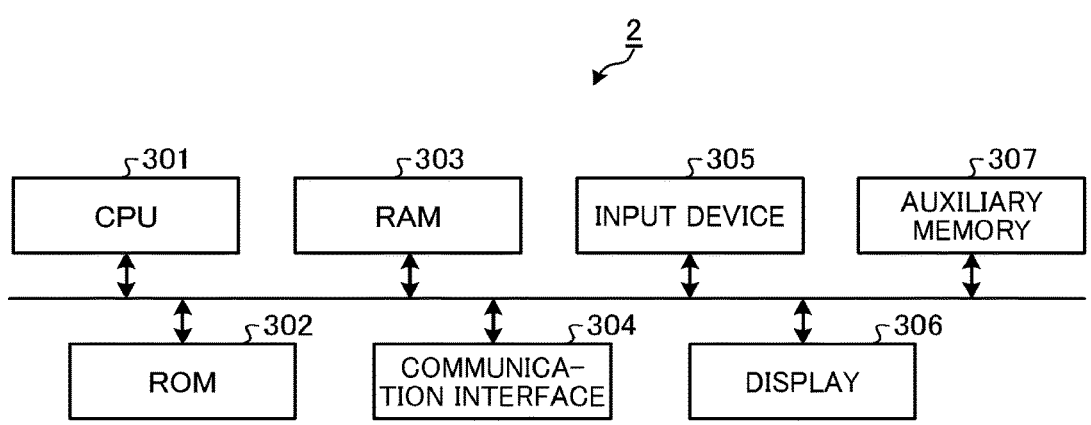
FIG. 2 is a block diagram illustrating an example of a hardware configuration of a server, according to an embodiment of the present disclosure.

FIG. 2 is a block diagram illustrating an example of a hardware configuration of the server 2. As illustrated in FIG. 2, the server 2 includes a central processing unit (CPU) 301, a read only memory (ROM) 302, a random access memory (RAM) 303, a communication interface 304, an input device 305, a display 306, and an auxiliary memory 307.

The CPU 301 controls overall operation of the server 2. The ROM 302 is a nonvolatile memory storing various types of data such as programs. The RAM 303 is a volatile memory that functions as a work area of processes executed by the CPU 301.

The communication interface 304 is an interface that connects the server 2 to the network 3. The input device 305 is a device that allows a user to input operations. Examples of the input device 305 include a mouse and a keyboard. The display 306 is a device that displays various types of information. Examples of the display 306 includes a liquid crystal display. Examples of the auxiliary memory 307 includes a hard disc drive (HDD).

Figure 3:
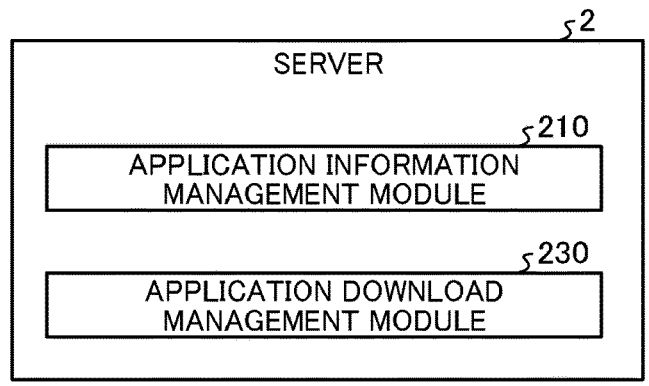
FIG. 3 is a block diagram illustrating an example of functions that the server includes, according to an embodiment of the present disclosure.

FIG. 3 is a block diagram illustrating an example of functions that the server 2 includes. As illustrated in FIG. 3, the server 2 has an application information management module 210 and an application download management module 230. Although only the modules related to the present embodiment are illustrated in the example of FIG. 3, modules that the server 2 includes are not limited thereto.

First, a description is given of functions of the application information management module 210.

Figure 4:
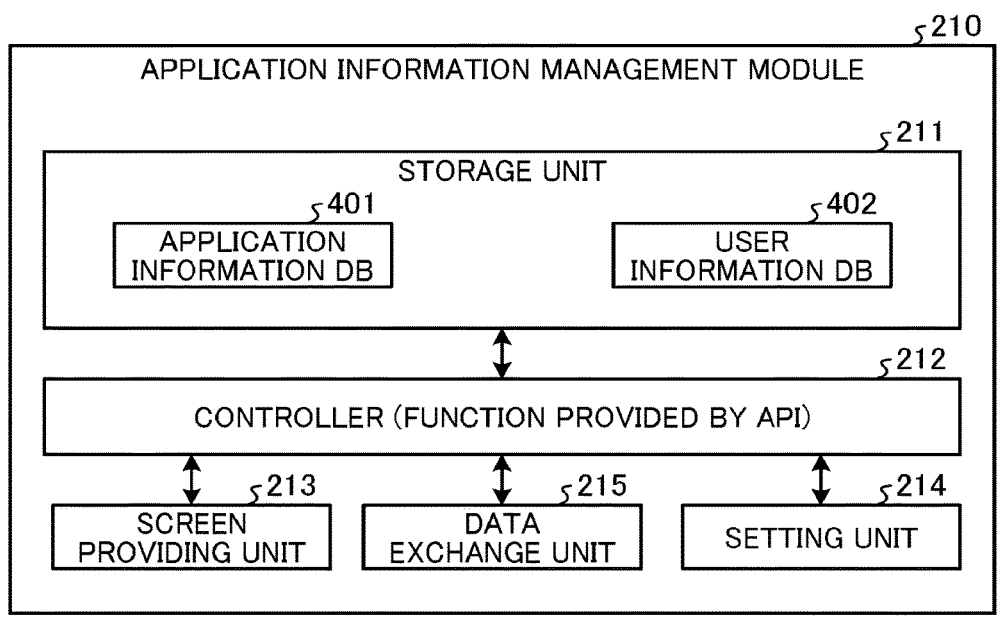
FIG. 4 is a block diagram illustrating an example of functions that an application information management module includes, according to an embodiment of the present disclosure.

FIG. 4 is a block diagram illustrating an example of functions that the application information management module 210 includes. The application information management module 210 includes a storage unit 211, a controller 212, a screen providing unit 213, a setting unit 214, and a data exchange unit 215. Although, in FIG. 4, functions related to the present embodiment are mainly illustrated, functions that the application information management module 210 includes are not limited thereto.

As illustrated in FIG. 4, the storage unit 211 has an application information database (hereinafter referred to as "application information DB") 401 and a user information database (hereinafter referred to as "user information DB") 402. Further, the storage unit 211 stores registration information registered via a device registration screen 600 (see FIG. 10), which is described later.

The application information DB 401 stores, for each of a plurality of applications, status information indicating whether the application is publicly available, a model code for identifying a model of a device that supports the application, required hardware, and a user interface (UI) language, in association with each other. In the present embodiment, the application information DB 401 stores first correspondence information illustrated in FIG. 5, second correspondence information illustrated in FIG. 6, third correspondence information illustrated in FIG. 7, and fourth correspondence information illustrated in FIG. 8.

As illustrated in FIG. 5, the first correspondence information is information associating a model identification (ID) assigned to each model of the MFP 4, a model name of the MFP 4, and a model code ("model information") for identifying the model of the MFP 4, with each other. In another example, a plurality of the model codes may be associated with one model ID. As illustrated in FIG. 6, the second correspondence information is application management information that associates an application ID identifying an application, a model code identifying a model of a device that supports the application, version information indicating the latest version of the application identified by the application ID, required hardware, and a UI language, with each other.

As illustrated in FIG. 7, the third correspondence information is information associating the application ID and status information indicating whether the application is publicly available, with each other. Combination of the first correspondence information, the second correspondence information and third correspondence information implements the association of the status information indicating whether the application is publicly available, the model code for identifying a model of a device that supports the application, the required hardware, and the UI language with each other, for each of the plurality of applications.

Further, as illustrated in FIG. 8, the fourth correspondence information is information associating an application ID, language information indicating a language of a country or a region in which the device is used, a display name of the application identified by the application ID, a message describing the application identified by the application ID, with each other. It should be noted that, in FIG. 8, the Japanese text "かんたんコピー" and "手軽にコピーができます" in the first record of the table mean "Easy Copier" and "You can copy easily" in English. Further, "OCRアプリ" and "テキスト文書に対して OCR を実施できます" in the third record of the table mean "OCR app" and "You can perform the OCR for the text document" in English. In addition, "翻訳アプリ" and "5言語に翻訳 できます" mean "Translation app" and "You can translate into five languages" in English. In the following description, combination of a display name and a message may be referred to as "application description information" that describes an application.

Referring again to FIG. 4, the further description is given of the storage unit 211. The user information DB 402 stores information required for authentication of a user authorized to perform an operation for settings by the setting unit 214, which is described later, for example.

The data exchange unit 215 exchanges data between the server 2 and the MFP 4. More specifically, the data exchange unit 215 receives, from the MFP 4, information relating to a device type of the MFP 4 and information relating to a user who has logged in to the MFP 4. Examples of the information relating to the user include a user type. In other words, the data exchange unit 215 functions as receiving means. Further, the data exchange unit 215 transmits, to the MFP 4, information relating to an application list screen, which is described later. In other words, the data exchange unit 215 functions as transmitting means.

The setting unit 214 sets screen information variably based on operation by a user, the device type, the user type, etc. In other words, the setting unit 214 functions as changing means. For example, the setting unit 214 sets the screen information indicating a layout of an application list screen (see FIG. 24) displaying a list of applications that can be used at the MFP 4, such as an arrangement of graphical parts on the application list screen or a background of the application list screen, variably based on operation by a user, the device type, the user type, etc. Thus, it is possible to cause display contents to vary depending on the device models, for example.

Figure 9:
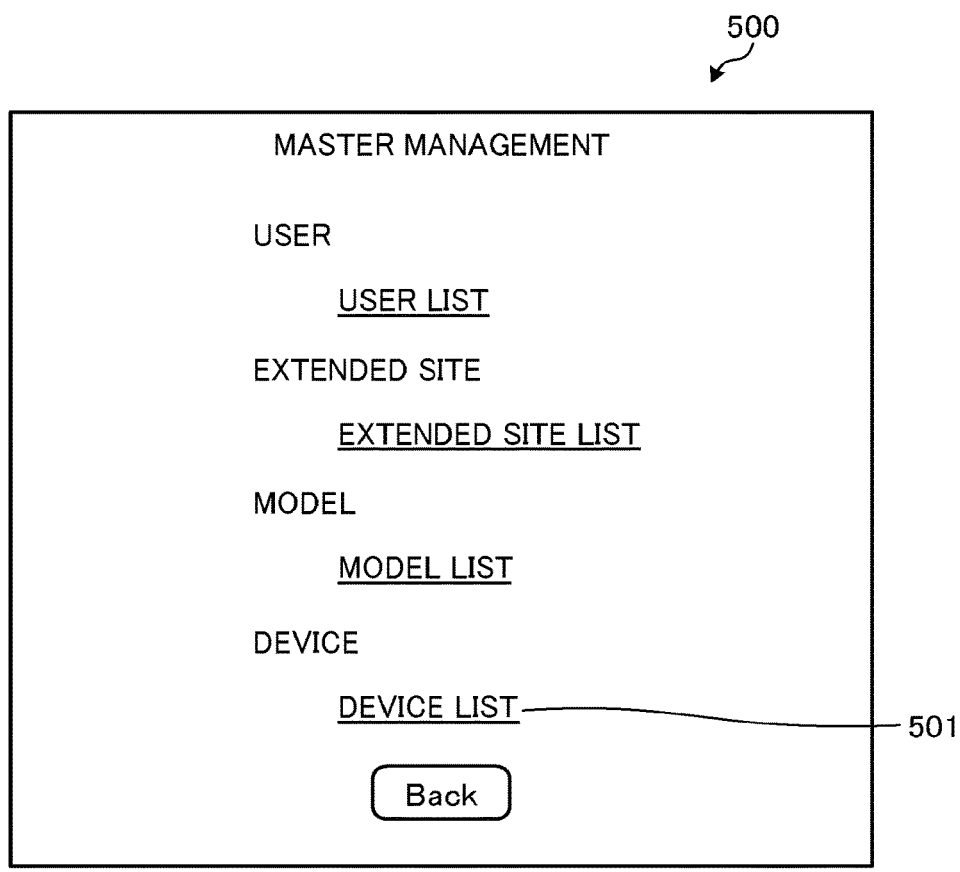
FIG. 9 is a diagram illustrating an example of a device registration setting screen, according to an embodiment of the present disclosure.

FIG. 9 is a diagram illustrating an example of a device registration setting screen 500. The setting unit 214 displays the device registration setting screen 500 illustrated in FIG. 9 on the browser of the PC 6 of the user who accesses a device registration site provided at the server 2. Various types of management are performed on the device registration setting screen 500 illustrated in FIG. 9. For example, the device registration setting screen 500 illustrated in FIG. 9 enables master management related to a user list, master management related to an extended site list, master management related to a model list, and master management related to a device list.

Hereinafter, a description is given of a case in which a user selects the master management related to the device list on the device registration setting screen 500 illustrated in FIG. 9. The user's selection of the "DEVICE LIST" 501 on the device registration setting screen 500 illustrated in FIG. 9 makes it possible to configure settings relating to the application list screen (see FIG. 24) displaying a list of applications usable at the MFP 4.

Figure 10:
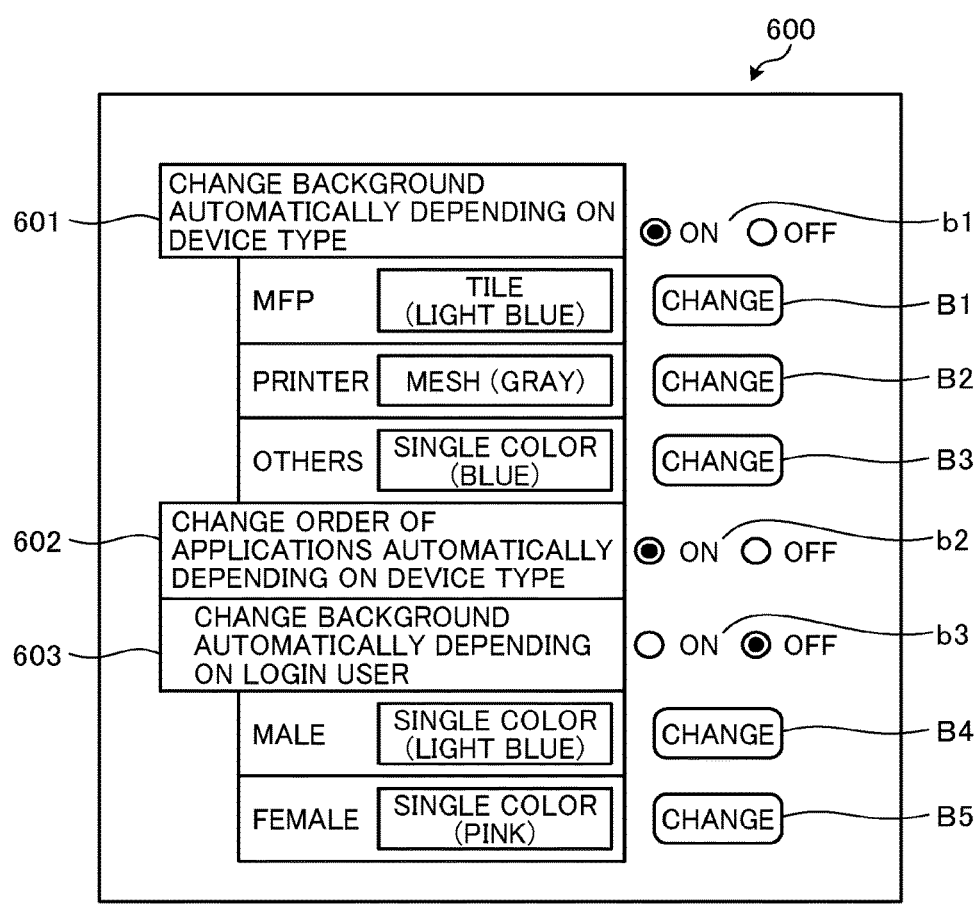
FIG. 10 is a diagram illustrating an example of a device registration screen, according to an embodiment of the present disclosure.

FIG. 10 is a diagram illustrating an example of a device registration screen 600. When a user selects the "DEVICE LIST" 501 on the device registration setting screen 500 illustrated in FIG. 9, the setting unit 214 controls the browser of the user's PC 6 to display the device registration screen 600 as illustrated in FIG. 10 based on the registration information stored in the storage unit 211. As illustrated in FIG. 10, the device registration screen 600 accepts settings for the following items, for example:

On/Off of automatic change of the background depending on device types

On/Off of automatic sorting of the application list depending on device types

On/Off of automatic change of the background depending on login users

For example, when "ON" (execution) is selected at radio buttons b1 for a "CHANGE BACKGROUND AUTOMATICALLY DEPENDING ON DEVICE TYPE" setting field 601, a background is changed to a preset background depending on the device type. As illustrated in FIG. 10, on the device registration screen 600, the background can be set depending on device types such as an MFP, a printer, and others. In the example of FIG. 10, "TILE (LIGHT BLUE)" is set for the MFP, "MESH (GRAY)" is set for the printer, and "SINGLE COLOR (BLUE)" is set for other devices.

Further, the background that is set depending on device types is changeable on the device registration screen 600 illustrated in FIG. 10. As illustrated in FIG. 10, the device registration screen 600 includes, at positions adjacent to the graphical representation indicating the backgrounds that are set depending on device types, change buttons B1 to B3 for declaring change of the settings. When any one of the change buttons B1 to B3 is selected, a pull-down menu for selecting a background is displayed. The background selected in the pull-down menu is set as a new background.

The setting configurable at the "CHANGE BACKGROUND AUTOMATICALLY DEPENDING ON DEVICE TYPE" setting field 601 is not limited to automatic change of screen backgrounds, and settings may be configured such that a background of a button of a recommended application is changed to a preset color depending on device types.

In addition, the setting configurable at the "CHANGE BACKGROUND AUTOMATICALLY DEPENDING ON DEVICE TYPE" setting field 601 is not limited to automatic change of screen backgrounds, and settings may be configured such that a color of an icon inside an application button is changed to a preset color depending on device types.

Further, when "ON" (execution) is selected at radio buttons b2 for a "CHANGE ORDER OF APPLICATIONS AUTOMATICALLY DEPENDING ON DEVICE TYPE" setting field 602, applications displayed on the application list screen (see FIG. 24), which is described later, are sorted by the number of downloads for each device type such as an MFP, a printer, or others.

FIG. 11 illustrates an example data structure of a table T storing the number of downloads of applications for each device type. The table T illustrated in FIG. 11 is stored in the auxiliary memory 307 of the server 2, for example. The table T illustrated in FIG. 11 stores the number of downloads of each application for each device type in a download unit 232 (see FIG. 14), which is described later, of the application download management module 230.

In other words, when "ON" (execution) is selected at radio buttons b2 for the "CHANGE ORDER OF APPLICATIONS AUTOMATICALLY DEPENDING ON DEVICE TYPE" setting field 602, applications displayed on the application list screen (see FIG. 24) are sorted by the number of downloads for each device type such as an MFP, a printer, or others, based on the table T illustrated in FIG. 11.

Specifically, the setting unit 214 sets, for each device type, a higher display priority in an order from the greater number of downloads. According to the table T illustrated in FIG. 11, when the device type is MFP, "Scan App 1" has the highest display priority. Accordingly, when the automatic sorting of the application list is effective, the setting unit 214 displays the "Scan App 1" at the top of the application list screen (see FIG. 24).

Furthermore, when "ON" (execution) is selected at radio buttons b3 for a "CHANGE BACKGROUND AUTOMATICALLY DEPENDING ON LOGIN USER" setting field 603, a background is changed to a preset background depending on attributes of users who have logged in to the device. For example, as illustrated in FIG. 10, on the device registration screen 600, the background can be set depending on attributes of login users such as male and female. In the example of FIG. 10, "SINGLE COLOR (LIGHT BLUE)" is set for male, and "SINGLE COLOR (PINK)" is set for female.

In addition, the background that is set depending on attributes of login users is changeable on the device registration screen 600 illustrated in FIG. 10. As illustrated in FIG. 10, the device registration screen 600 includes, at positions adjacent to the graphical representation indicating the backgrounds that are set depending on attributes of login users, change buttons B4 and B5 for declaring change of the settings. When any one of the change buttons B4 and B5 is selected, a pull-down menu for selecting a background is displayed. The background selected in the pull-down menu is set as a new background.

Figure 12:
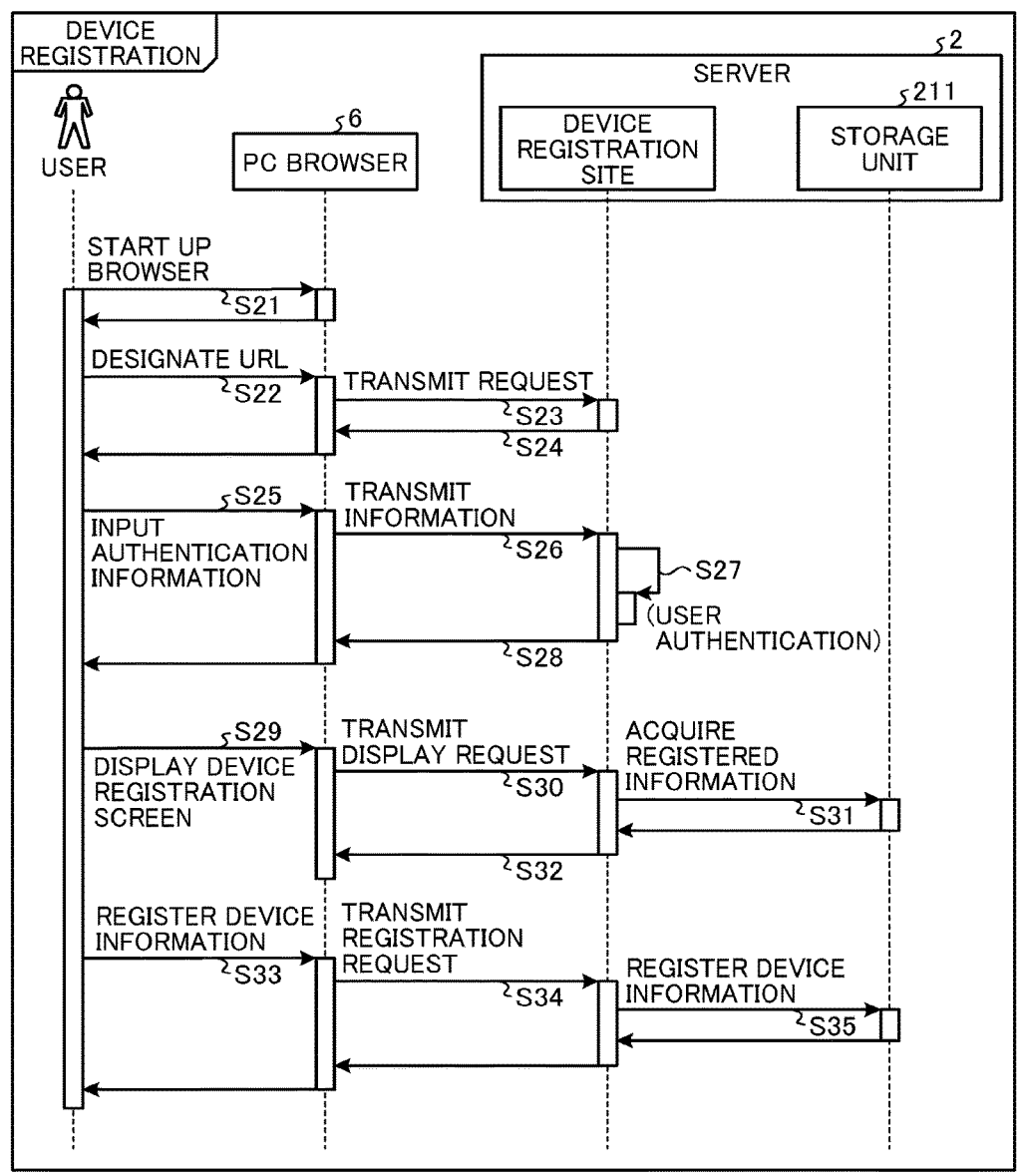
FIG. 12 is a sequence diagram illustrating an example of a flow of device registration, according to an embodiment of the present disclosure.

Hereinafter, a description is given of a flow of the above-described device registration. FIG. 12 is a sequence diagram illustrating an example of a flow of the device registration.

As illustrated in FIG. 12, a user activates the browser of the PC 6 (step S21) and designates a uniform resource locator (URL) of the device registration site at the server 2 (step S22).

The browser of the PC 6 transmits a request to the device registration site designated by the URL at the server 2 (step S23). The device registration site at the server 2 controls the browser of the PC 6 to display an authentication information input screen, as a response to the transmission of request (step S24). Next, the user enters authentication information on the authentication information input screen (step S25).

The browser of the PC 6 transmits the entered authentication information to the device registration site at the server 2 (step S26). The device registration site at the server 2 performs user authentication based on the transmitted authentication information (step S27). Further, the device registration site returns an authentication result to the browser of the PC 6 (step S28). The authenticated user instructs display of the device registration screen 600 as illustrated in FIG. 10 (step S29).

The browser of the PC 6 transmits a display request of the device registration screen 600 to the device registration site at the server 2 (step S30). The device registration site of the server 2 acquires registered information from the storage unit 211 (step S31). Further, the device registration site controls the browser of the PC 6 to display the device registration screen 600 generated based on the registered information (step S32).

The user registers device information on the device registration screen 600 displayed by the browser of the PC 6 (step S33).

The browser of the PC 6 transmits a registration request of the device information to the device registration site at the server 2 (step S34). The device registration site at the server 2 registers the device information in the storage unit 211 (step S35).

A description is given heretofore of the flow of device registration.

Hereinafter, a description is given of functions that the controller 212 includes. In the present embodiment, the functions that the controller 212 includes are provided by an application programming interface (API) on the server 2 side.

First, for the sake of explanatory convenience, a description is given of functions of the screen providing unit 213 illustrated in FIG. 4, prior to describing the functions that the controller 212 includes. In response to receiving a screen information request requesting screen information from the MFP 4, the screen providing unit 213 generates web content data (screen information) including at least an application command. Further, the screen providing unit 213 transmits, to the MFP 4, the generated web content data (screen information) as a response to the screen information request. The web content data (screen information) includes, for example, Hypertext Markup Language (HTML), Cascading Style Sheets (CSS) and JavaScript (registered trademark) included in HTML (or referenced from HTML). The web browser (a display controller 262, described later) of the MFP 4 displays the web content data (screen information) and requests the API (controller 212) of the server 2 for display information by using a technique called Asynchronous JavaScript And XML (Ajax) of JavaScript. For example, when the application command is JavaScript, the script itself may be embedded in the HTML. In another example, a link may be described in the HTML. In this example, a display information request including the model code of the MFP 4, from which the display information request is transmitted, and requesting the display information is transmitted to the controller 212. Examples of the application command according to the present embodiment include an installation instruction, an update instruction, and an uninstallation instruction. The installation instruction indicates an instruction to install an application. The update instruction indicates an instruction to update an application. The uninstallation instruction indicates an instruction to delete an already-installed application and restore the MFP 4 to a state before the already-installed application was installed.

Figure 13:
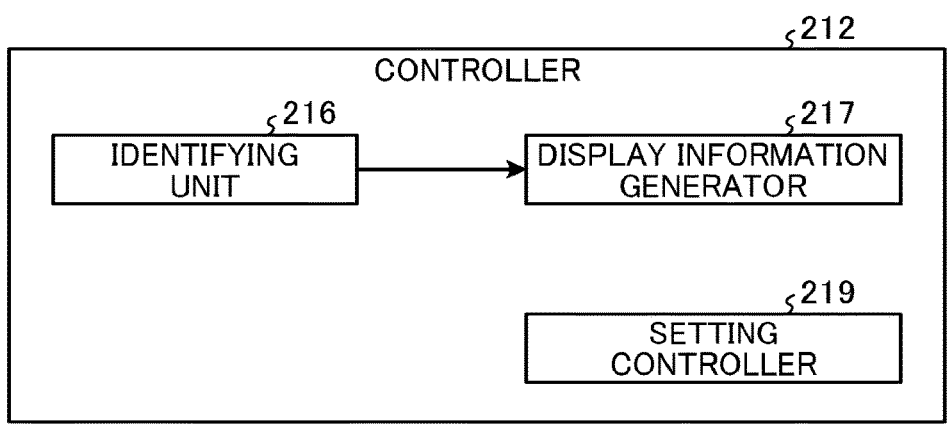
FIG. 13 is a block diagram illustrating an example of functions that a controller includes, according to an embodiment of the present disclosure.

FIG. 13 is a block diagram illustrating an example of functions that the controller 212 includes. As illustrated in FIG. 13, the controller 212 includes an identifying unit 216, a display information generator 217, and a setting controller 219.

In response to receiving, from the MFP 4 (device), the display information request including at least the model code and requesting the display information, the identifying unit 216 refers to information stored in the storage unit 211 (in this example, in the application information DB 401), to identify one or more applications corresponding to the combination of the model ID included in the display information request and the status information indicating the state of being publicly available.

More specifically, in response to receiving the display information request from the MFP 4, the identifying unit 216 refers to the first correspondence information as illustrated in FIG. 5, to select the model code associated with the model ID included in the received display information request. Next, the identifying unit 216 refers to the second correspondence information illustrated in FIG. 6, to select one or more application IDs and required hardware associated with the selected model code. It should be noted that the required hardware includes not only a category indicating the hardware but also a list of corresponding hardware models.

Next, the identifying unit 216 refers to the third correspondence information illustrated in FIG. 7, to select, from among the selected one or more application IDs, one or more application IDs associated with the status information indicating the application is publicly available. The identifying unit 216 identifies each of one or more applications identified by the one or more application IDs selected as described above as an application associated with the combination of the model code included in the display information request received from the MFP 4, the required hardware, the status information indicating that the application is publicly available, and the UI language. In other words, the identifying unit 216 identifies each of one or more applications identified by each of the one or more application IDs selected as described above as an application usable at the MFP 4 as a request source, from which the display information request is transmitted.

In addition, since the display information request according to the present embodiment includes language information (locale information) indicating a language of a country or a region in which the MFP 4 as the request source of the display information request is used, the identifying unit 216 refers to the fourth correspondence information as illustrated in FIG. 8, to identify the application description information associated with the combination of the application ID identified as described above and the language information included in the display information request received from the MFP 4. It should be noted that the language information is usually described in the Accept-Language header of HTTP.

Referring again to FIG. 13, a description is given of the display information generator 217 and the setting controller 219. The display information generator 217 generates web content data (display information) indicating the one or more applications identified by the identifying unit 216, and transmits the generated web content data (display information) to the MFP 4 as a response to the display information request. The web content data (display information) according to the present embodiment includes application detail information associating each of the one or more applications (e.g., each application ID) usable at the MFP 4 as the request source, from which the display information request is transmitted, with detailed information indicating details of the application. Examples of the detailed information include version information, application description information.

The setting controller 219 performs control such that the information stored in the storage unit 211 reflects the settings configured by the setting unit 214. In other words, the setting controller 219 updates the information stored in the storage unit 211 based on the settings configured by the setting unit 214. In this example, the setting unit 214 has a function of setting the screen information on the application list screen (see FIG. 24) displaying a list of applications that are usable at the MFP 4 in a variable manner based on operation by a user, the device type, the user type, etc. For example, the setting unit 214 sets the application description information on the application list screen (see FIG. 24) and the screen information which is a layout such as a background or an arrangement of graphical components on the application list screen (see FIG. 24), in a variable manner based on operation by a user, the device type, the user type, etc. Thus, it is possible to cause display contents to vary depending on the device models, for example.

Each of the above described functions of the controller 212, the screen providing unit 213, and the setting unit 214 is implemented by the CPU 301 executing a program stored in a storage device such as the ROM 302. In addition, the storage unit 211 described above is implemented by the ROM 302 or the auxiliary memory 307 such as an HDD. In this example, it can be considered that the combination of the controller 212 and the screen providing unit 213 corresponds to a function ("controller") of transmitting, in response to a request from the MFP 4, the web content data including the display information indicating one or more applications that are usable at the MFP 4 and the screen information including at least an application command.

Hereinafter, a description is given of functions that the application download management module 230 includes.

Figure 14:
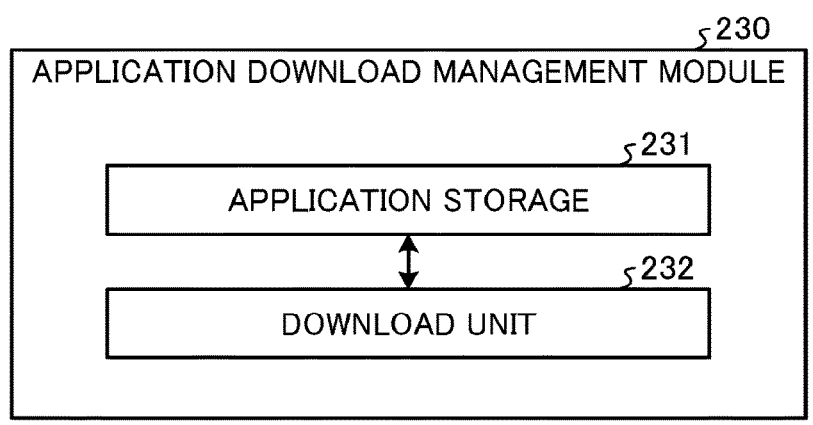
FIG. 14 is a block diagram illustrating an example of functions that an application download management module includes, according to an embodiment of the present disclosure.

FIG. 14 is a block diagram illustrating an example of functions that the application download management module 230 includes. As illustrated in FIG. 14, the application download management module 230 includes an application storage 231 and a download unit 232. Although in FIG. 14, functions related to the present embodiment are mainly illustrated, functions that the application download management module 230 includes are not limited thereto.

The application storage 231 stores a plurality of applications to be provided to the MFP 4. In this example, the application storage 231 stores, for each of a plurality of application IDs, a data file including an application body in association with the application ID.

In response to a request from the MFP 4, the download unit 232 performs control of transmitting (downloading) any application stored in the application storage 231 to the MFP 4. In this example, in response to receiving, from the MFP 4, a download request including at least an application ID and requesting download of the application, the download unit 232 transmits the application corresponding to the application ID included in the received download request to the MFP 4. More specifically, the download unit 232 refers to the application storage 231, to identify a data file corresponding to the application ID included in the download request received from the MFP 4. The download unit 232 transmits the identified data file to the MFP 4.

The above-described functions of the download unit 232 is implemented by the CPU 301 executing a program stored in a storage device such as the ROM 302. In addition, the application storage 231 as described above is implemented by the ROM 302 or the auxiliary memory 307 such as an HDD.

A description is given heretofore of the configuration of the server 2. It should be noted that, as illustrated in FIG. 1, the server 2 may be configured by a plurality of servers. For example, as illustrated in FIG. 15, the server 2 may be configured by an application server 240 and a database server 250. For example, the application server 240 may include the controller 212, screen providing unit 213, and setting unit 214, described above. Further, the application server 240 may be configured by a plurality of servers. In this case, the controller 212, the screen providing unit 213, the setting unit 214, and the download unit 232 described above may be distributed over the plurality of servers.

Further, for example, the database server 250 may include the above-described storage unit 211. Further, the database server 250 may be configured by a plurality of servers. In this case, the application information DB 401, the user information DB 402, and the application storage 231 described above may be distributed over the plurality of servers.

Hereinafter, a description is given of a hardware configuration of the MFP 4 with reference to FIG. 16. As illustrated in FIG. 16, the MFP 4 includes a main unit 10 and an operation unit 20. The main unit 10 is capable of implementing various functions such as a copier function, a scanner function, a facsimile function, and a printer function. The operation unit 20 receives a user's operation. In this disclosure, the "receiving a user's operation" is a concept including receiving information that is input in response to the user's operation. The information to be received may include a signal indicating a coordinate value on a screen. The main unit 10 and the operation unit 20 are communicably connected with each other via a dedicated communication path 30. The communication path 30 may be in compliance with a universal serial bus (USB) standard. However, any arbitrary standard, regardless of wired or wireless, may be used as the communication path 30.

The main unit 10 operates in response to an operation received by the operation unit 20. Further, the main unit 10 is communicable with an external device such as the PC 6. The main unit 10 is also capable of performing an operation in response to an instruction received from the external device.

First, a description is given of a hardware configuration of the main unit 10 hereinafter. As illustrated in FIG. 16, the main unit 10 includes a CPU 11, a ROM 12, a RAM 13, an HDD 14, and a communication interface 15, a connection interface 16, and an engine 17, which are connected with one another via a system bus 18.

The CPU 11 controls entire operation of the main unit 10. The CPU 11 controls the entire operation of the main unit 10 by executing programs stored in the ROM 12 or the HDD 14, etc., using the RAM 13 as a work area, to implement various functions such as a copier function, a scanner function, a facsimile function and a printer function as described above.

The communication interface 15 is an interface for connecting the main unit 10 with the network 3. The connection interface 16 is an interface for enabling the main unit 10 to communicate with the operation unit 20 via the communication path 30.

The engine 17 is hardware that performs processing other than general-purpose information processing and data communications. For example, the engine 17 performs processing for implementing the copier function, the scanner function, the facsimile function, and the printer function. The engine 17 includes, for example, a scanner (image reading unit) that scans and reads an image on a document, a plotter (image forming unit) that performs printing on sheet materials such as a sheet of paper, and a facsimile unit that performs facsimile communication. Further, the engine 17 may further include optional equipment (hardware) such as a finisher that sorts printed sheet materials and an automatic document feeder (ADF) that automatically feeds documents to be scanned.

Next, a description is given of a hardware configuration of the operation unit 20 hereinafter. As illustrated in FIG. 16, the operation unit 20 includes a CPU 21, a ROM 22, a RAM 23, a flash memory 24, a connection interface 26, and a control panel 27, which are connected with one another via a system bus 28.

The CPU 21 controls entire operation of the operation unit 20. The CPU 21 controls the entire operation of the operation unit 20 by executing programs stored in the ROM 22 or the flash memory 24, etc., using the RAM 23 as a work area, to implement various functions described later, such as displaying information or images in response to an input from the user.

The connection interface 26 is an interface for enabling the operation unit 20 to communicate with the main unit 10 via the communication path 30. In other words, the operation unit 20 connects to the network 3 via the communication path 30.

The control panel 27 receives various inputs in response to user's operation and displays various information, such as information corresponding to the received operation, information indicating an operational status of the MFP 4, information indicating a setting status. In this example, the control panel 27 is implemented by a liquid crystal display (LCD) having a touch panel function, however, such an LCD is just an example. In another example, the control panel 27 may be implemented by an organic electroluminescence (EL) display having a touch panel function. In alternative to or in addition to the LCD or the EL display, the control panel 27 may include an operation unit such as hardware keys and/or a display unit such as an indicator lamp.

Figure 17:
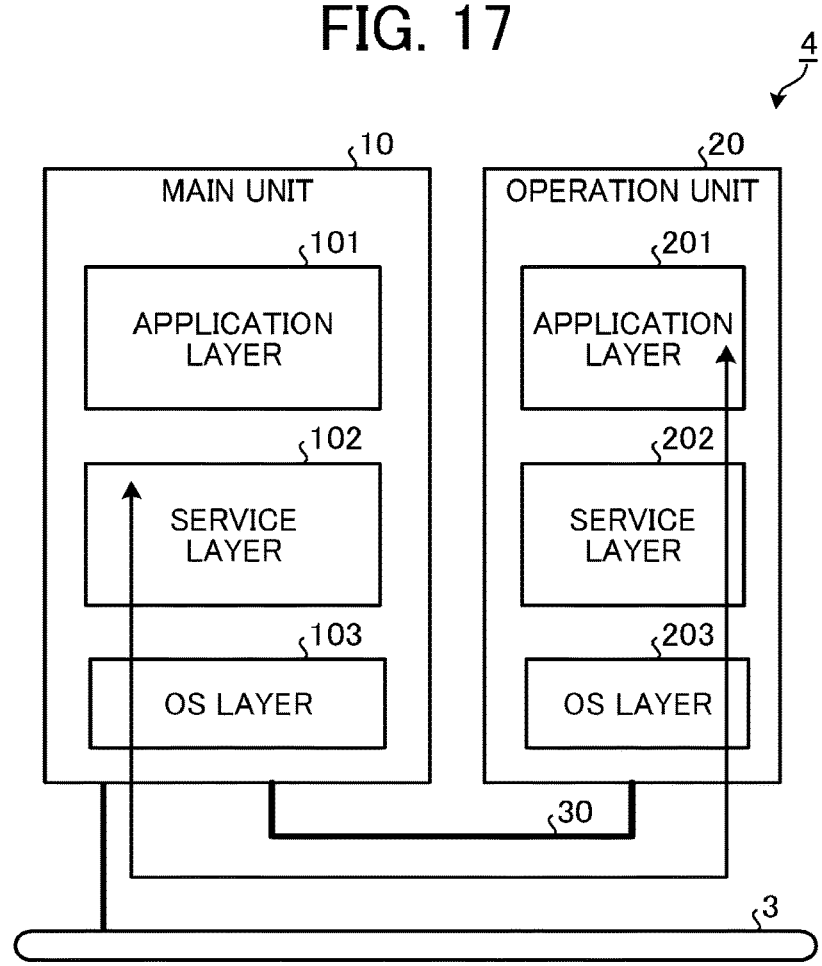
FIG. 17 is a block diagram illustrating an example of a software configuration of the MFP, according to an embodiment of the present disclosure.

Next, a description is given of a software configuration of the MFP 4 hereinafter. FIG. 17 is a schematic diagram illustrating an example of a software configuration of the MFP 4. As illustrated in FIG. 17, the main unit 10 includes an application layer 101, a service layer 102 and an operating system (OS) layer 103. The entities of the application layer 101, the service layer 102 and the OS layer 103 are various types of software stored in the ROM 12 or the HDD 14. The CPU 11 executes these various types of software to provide various functions.

The software of the application layer 101 is an application software that causes hardware resources to operate to provide specific functions. The "application software" may be referred to as simply an "application" hereinafter. Examples of the application include a copy application that provides a copier function, a scanner application that provides a scanner function, a facsimile application that provides a facsimile function, and a printer application that provides a printer function.

The software of the service layer 102, which is provided between the application layer 101 and the OS layer 103, provides the application with an interface for using the hardware resources of the main unit 10. More specifically, the software of the service layer 102 provides functions of receiving operation requests to the hardware resources and mediating the operation requests. Examples of the operation requests that the service layer 102 receives may include a request for scanning by the scanner and a request for printing by the plotter.

The interface function by the service layer 102 may be also provided to an application layer 201 of the operation unit 20 as well as to the application layer 101 of the main unit 10. In other words, the application layer 201 (application) of the operation unit 20 is also capable of implementing functions that use the hardware resources such as the engine 17 of the main unit 10 via the interface function of the service layer 102.

The software of the OS layer 103 is basic software (operating system (OS)) that provides basic functions of controlling the hardware that the main unit 10 includes. The software of the service layer 102 converts each of the requests received from various applications for using the hardware resources, to a command that is interpretable by the OS layer 103. The software of the service layer 102 passes the command to the OS layer 103. The software of the OS layer 103 executes the command to enable the hardware resources to operate in accordance with the request by the application.

The operation unit 20 similarly includes the application layer 201, a service layer 202 and an OS layer 203. The application layer 201, the service layer 202 and the OS layer 203 of the operation unit 20 has a similar layer structure to that of the main unit 10. However, functions provided by an application of the application layer 201 and operation requests to be received by the service layer 202 are different from those of the main unit 10. The application of the application layer 201 may be software that causes hardware resources of the operation unit 20 to operate to implement specific functions. However, the application of the application layer 201 is mainly software for implementing a UI function for operating or displaying functions that the main unit 10 includes, such as the copier function, the scanner function, the facsimile function, and the printer function. In this example, the application of the application layer 201 includes an application for providing a web browser function, an application for the application site, an application for providing a function of executing an application command included in the above-described web content data. The application for providing the web browser function may be referred to as a "browser application" hereinafter. The application for providing the function of executing the application command included in the web content data may be referred to as an "installer" hereinafter.

In the present embodiment, the software of the OS layer 103 that the main unit 10 includes and the software of the OS layer 203 that the operation unit 20 includes are different from each other in order to maintain the independency of functions. In other words, the main unit 10 and the operation unit 20 operate independently with each other on separate operating systems. For example, Linux (registered trademark) may be used as the software of the OS layer 103 of the main unit 10, whereas Android (registered trademark) may be used as the software of the OS layer 203 of the operation unit 20.

As described above, in the MFP 4 according to the present embodiment, the main unit 10 and the operation unit 20 operate on different operating systems. Accordingly, communications between the main unit 10 and the operation unit 20 are performed as communications between separate apparatuses, instead of interprocess communication within a common apparatus. Examples of the communications between the main unit 10 and the operation unit 20 may include command communication, which is an operation of transmitting information (e.g., instruction contents from a user) received by the operation unit 20 to the main unit 10. Examples of the communications between the main unit 10 and the operation unit 20 may further include an operation by the main unit 10 of notifying the operation unit 20 of an event. In this embodiment, the operation unit 20 communicates commands to the main unit 10 to use the functions of the main unit 10. Examples of the events notified from the main unit 10 to the operation unit 20 may include an execution status of operation in the main unit 10 and contents that are set in the main unit 10.

In addition, in the present embodiment, power is supplied from the main unit 10 to the operation unit 20 via the communication path 30. Accordingly, the power control of the operation unit 20 may be performed separately (independently) from the power control of the main unit 10.

Next, a description is given of functions that the main unit 10 of the MFP 4 includes hereinafter.

Figure 18:
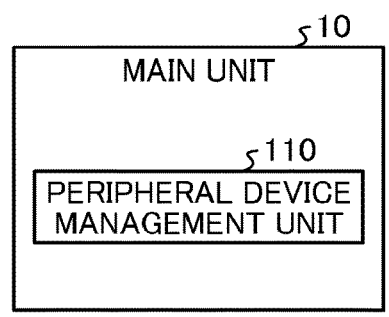
FIG. 18 is a block diagram illustrating an example of functions that a main unit of the MFP includes, according to an embodiment of the present disclosure.

FIG. 18 is a block diagram illustrating an example of functions that the main unit 10 of the MFP 4 includes. As illustrated in FIG. 18, the main unit 10 of the MFP 4 has a peripheral device management unit 110. Although in FIG. 18, functions related to the present embodiment are mainly illustrated, functions that the main unit 10 of the MFP 4 includes are not limited thereto.

The peripheral device management unit 110 is implemented by the CPU 11 executing the software described above. In another example, the peripheral device management unit 110 may be implement by hardware such as a circuit.

The peripheral device management unit 110 manages peripheral devices connectable to the MFP 4. Examples of the peripheral device connectable to the MFP 4 include a camera, a finisher, a motion detector to detect moving objects, particularly people. The peripheral device management unit 110 stores information of the peripheral devices in the HDD 14, for example.

Next, a description is given of functions that the operation unit 20 of the MFP 4 includes hereinafter.

Figure 19:
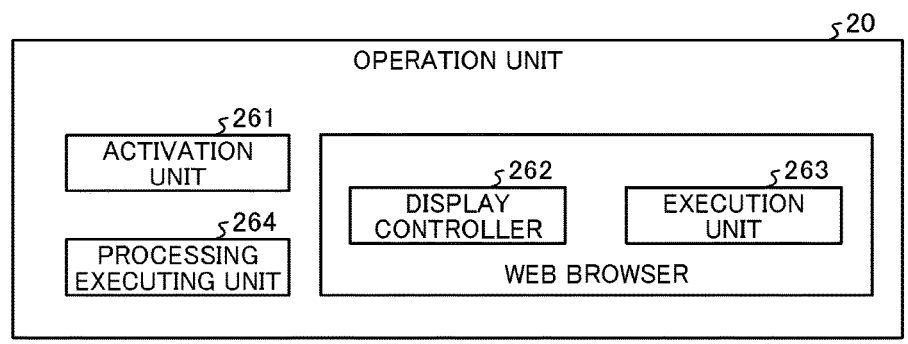
FIG. 19 is a block diagram illustrating an example of functions that an operation unit of the MFP includes, according to an embodiment of the present disclosure.

FIG. 19 is a block diagram illustrating an example of functions that the operation unit 20 of the MFP 4 includes. As illustrated in FIG. 19, the operation unit 20 includes an activation unit 261, a display controller 262, an execution unit 263, and a processing executing unit 264. Although in FIG. 19, functions related to the present embodiment are mainly illustrated, functions that the operation unit 20 includes are not limited thereto. In addition, as illustrated in FIG. 19, the display controller 262 and the execution unit 263 are implemented at a web browser.

Figure 20:
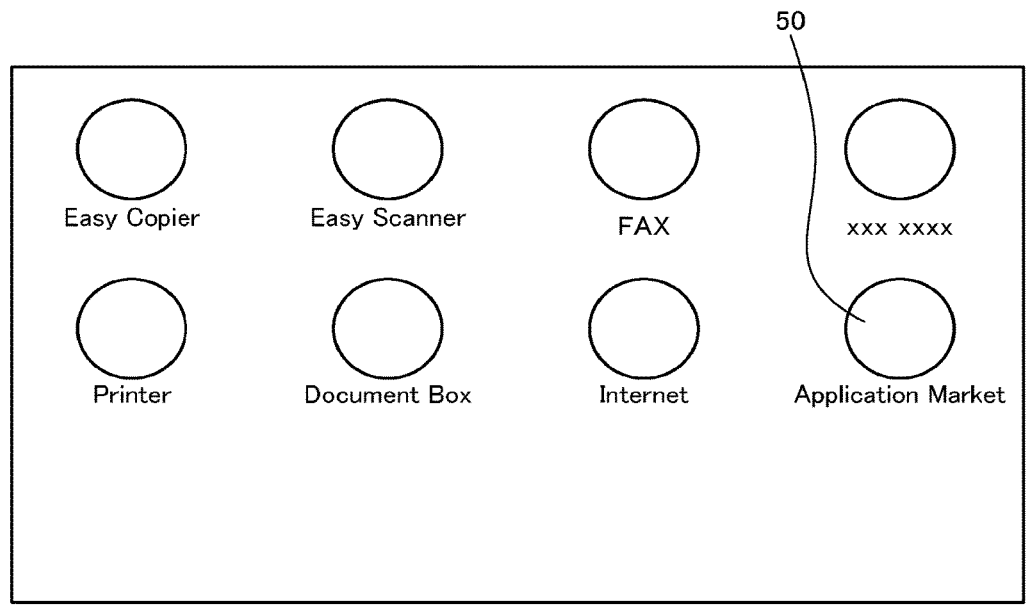
FIG. 20 is a diagram illustrating an example of an operation screen, according to an embodiment of the present disclosure.

For example, in response to receiving selection (pressing) of an icon 50 named "Application Market" in a state where an operation screen as illustrated in FIG. 20 is displayed on the control panel 27, the activation unit 261 of the application for the application site requests the main unit 10 of the MFP 4 to transmit the model code (device type) identifying the MFP 4. The main unit 10 of the MFP 4 transmits the model code (device type) identifying the model of the MFP 4 to the activation unit 261 of the application for the application site of the operation unit 20. Further, the activation unit 261 of the application for the application site requests information indicating a user who currently logs in to the MFP 4 from the main unit 10 of the MFP 4. The main unit 10 of the MFP 4 transmits the information indicating the user who currently logs in to the MFP 4 to the activation unit 261 of the application for the application site of the operation unit 20.

Next, the activation unit 261 starts up a browser application that implements a web browser function. For example, in response to receiving selection (pressing) of the icon 50 named "Application Market" in a state where an operation screen as illustrated in FIG. 20 is displayed on the control panel 27, the activation unit 261 acquires an URL indicating the location of the server 2 on the network 3 and performs control to activate the browser application.

The activated browser application transmits the above-described screen information request as an HTTP request to the server 2 specified by the URL received from activation unit 261. Further, the browser application receives the web content data (screen information) as a response (HTTP response) to the screen information request. In this example, the browser application receives, as the web content data (screen information), HTML and CSS/JavaScript included in HTML (or referenced from HTML). The browser application interprets and executes JavaScript, and transmits the above-described display information request as an HTTP request to the server 2 using Ajax. The display information request to be transmitted is, for example, an application list request including the model code (device type) and the user information. The browser application receives, as a response (HTTP response) to the display information request, the web content data (display information) including at least an application command.

FIGS. 21A and 21B are a diagram illustrating an example of a response of the application list, which is received as a response to the display information request. According to the response example of the application list illustrated in FIGS. 21A and 21B, contents to be displayed on the application site of the server 2 includes a list named "warnings" indicating information required by each application to display a warning. In a case where an UI language supported by an application is set in advance (see FIG. 6) when registering the application at the application site of the server 2, information representing the UI language is added to the list of "warnings", as illustrated in FIG. 21A. Further, as illustrated in FIG. 21A, a list of the supported UI languages is added to "warning_options".

For example, as illustrated in FIG. 21A, in a case where UT languages (e.g., English and Spanish) supported by an application are set in advance in association with the application when registering the application at the application site of the server 2, "UI language" representing an UI language is added to the list of "warnings". Further, a list of the supported UI languages (i.e., "ui_english" and "ui_spanish") is added to "warning_options" in the list of "warnings".

In a substantially same manner, when required hardware, which is a peripheral device supported by an application is set in advance (see FIG. 6) when registering the application at the application site of the server 2, information representing the peripheral device (required hardware) is added to the list of "warnings", as illustrated in FIG. 21B. Further, as illustrated in FIG. 21B, a list of the supported peripheral devices is added to "warning_options".

For example, as illustrated in FIG. 21B, when peripheral devices (e.g., a camera and a USB memory) supported by an application are set in advance in association with the application when registering the application at the application site of the server 2, "peripheral device" representing a peripheral device is added to the list of "warnings". Further, a list of the supported peripheral devices (i.e., "camera" and "usb_memory") is added to "warning_options" in the list of "warnings".

FIG. 22 is a diagram illustrating an example of a response of a warning list, which is received as a response to the display information request. The response example of the warning list illustrated in FIG. 22 describes a list of warning_messages associated with "warning_id (=warning_options)".

For example, as illustrated in FIG. 22, when there is "ui_japanese" as "warning_id (=warning_options)", "Not support Japanese" is described as "warning_message" which is a warning.

For example, as illustrated in FIG. 22, when there is "camera" as "warning_id (=warning_options)", "Camera App" is described as "warning_message" which is a warning.

Furthermore, the activated browser application transmits a request for checking settings or specifications of the MFP 4 to the main unit 10. The browser application receives a response (HTTP response) to the request for checking the settings or the specifications.

FIG. 23 is a diagram illustrating an example of a response, which is received as a response to the request for checking the settings or specifications of the MFP 4. The response example illustrated in FIG. 23 describes that the language of information displayed on the control panel 27 of the MFP 4 is Japanese and that a peripheral device attachable to the MFP 4 is a camera. The response example illustrated in FIG. 23 describes information indicating whether the peripheral device is attachable to the MFP 4, rather than information indicating whether the peripheral device is currently attached to the MFP 4.

Further, the browser application performs control to display, on the control panel 27 (display unit), a screen configured based on the web content data (the screen information and the display information) received from the server 2. In this embodiment, the functions of the display controller 262 is implemented by the browser application. Further, as described above, in this example, the display controller 262 generates a screen based on the web content data (the screen information and the display information) received from the server 2, and displays the generated screen on the control panel 27. The display controller 262 stores the web content data (the screen information and the display information) received from the server 2 in a storage device such as the flash memory 24. Further, the display controller 262 reads out the web content data (the screen information and the display information) as needed from the storage device, and generate a screen using the read-out web content data (the screen information and the display information).

In this example, the display controller 262 specifies an application command that is selected in response to a user's operation on the screen displayed on the control panel 27, i.e., on the screen configured based on the web content data (the screen information and the display information). Further, the display controller 262 notifies the execution unit 263 of the specified application command. For example, the display controller 262 may specify the application command selected by the user as JavaScript or a custom scheme.

The execution unit 263 executes an application command that is included in the web content data in response to a user's operation via the screen displayed on the control panel 27, from among application commands included in the web content data. In other words, the execution unit 263 executes the application command notified from the display controller 262, to requests the MFP 4 to execute processing related to the application corresponding to the executed application command. In the present embodiment, the functions of the execution unit 263 are provided by an API on the MFP 4 side. The MFP 4 calls the API from the web application that is located in the server 2 as being usable by the browser application of the operation unit 20.

Based on the request from the web browser (execution unit 263), the processing executing unit 264 performs processing related to the application corresponding to the request.

As described above, examples of the application command included in the web content data received from the server 2 include an installation instruction, an update instruction, and an uninstallation instruction.

Hereinafter, a description is given of an example case in which the installation instruction is selected in response to a user's operation on the screen configured based on the web content data (the screen information and the display information) received from the server 2. In this case, the execution unit 263 notifies the processing executing unit 264 of the installation instruction selected in response to the user's operation. The processing executing unit 264 executes the installation instruction notified from the execution unit 263. The more specific description is given hereinafter.

In this example, the display controller 262 performs control to display, on the control panel 27, the application list screen displaying a list of applications usable at the MFP 4, using the web content data (the screen information and the display information) received from the server 2.

Figure 24:
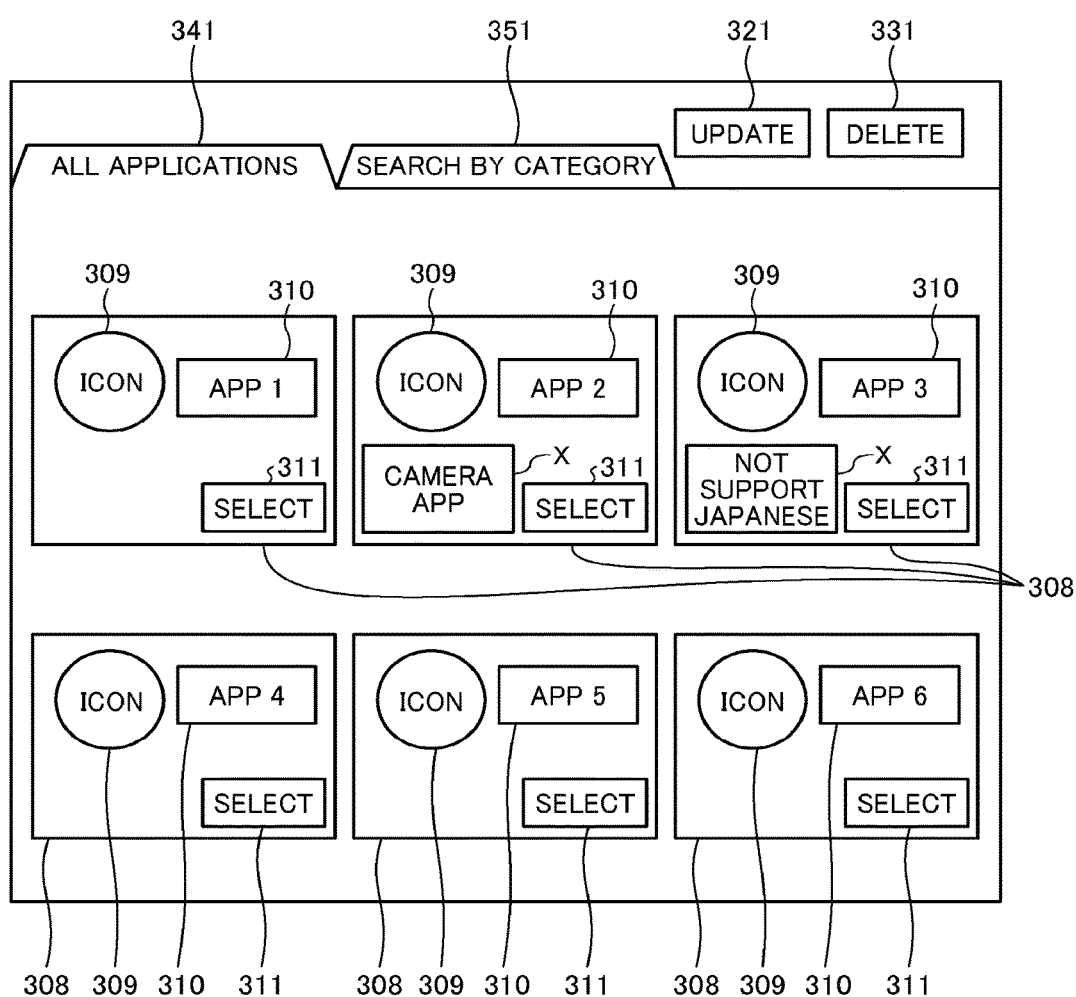
FIG. 24 is a diagram illustrating an example of an application list screen, according to an embodiment of the present disclosure.

FIG. 24 illustrates an example of the application list screen. In the example of FIG. 24, the application list screen displays a list of application buttons 308 corresponding to the applications usable at the MFP 4. Each application button 308 includes at least a name 310 of the application, an application selection button 311 for selecting the application, an icon 309 representing the application. In the example of FIG. 24, the application list screen further displays an update selection button 321 for selecting an application update and a delete selection button 331 for selecting application deletion. A detailed description is given later of display of these buttons or icon.

As described above, in the application list screen, the background of the application list screen, the display order of applications, and the like are changed depending on the model code (device type) identifying the model of the MFP 4.

Figure 25A:
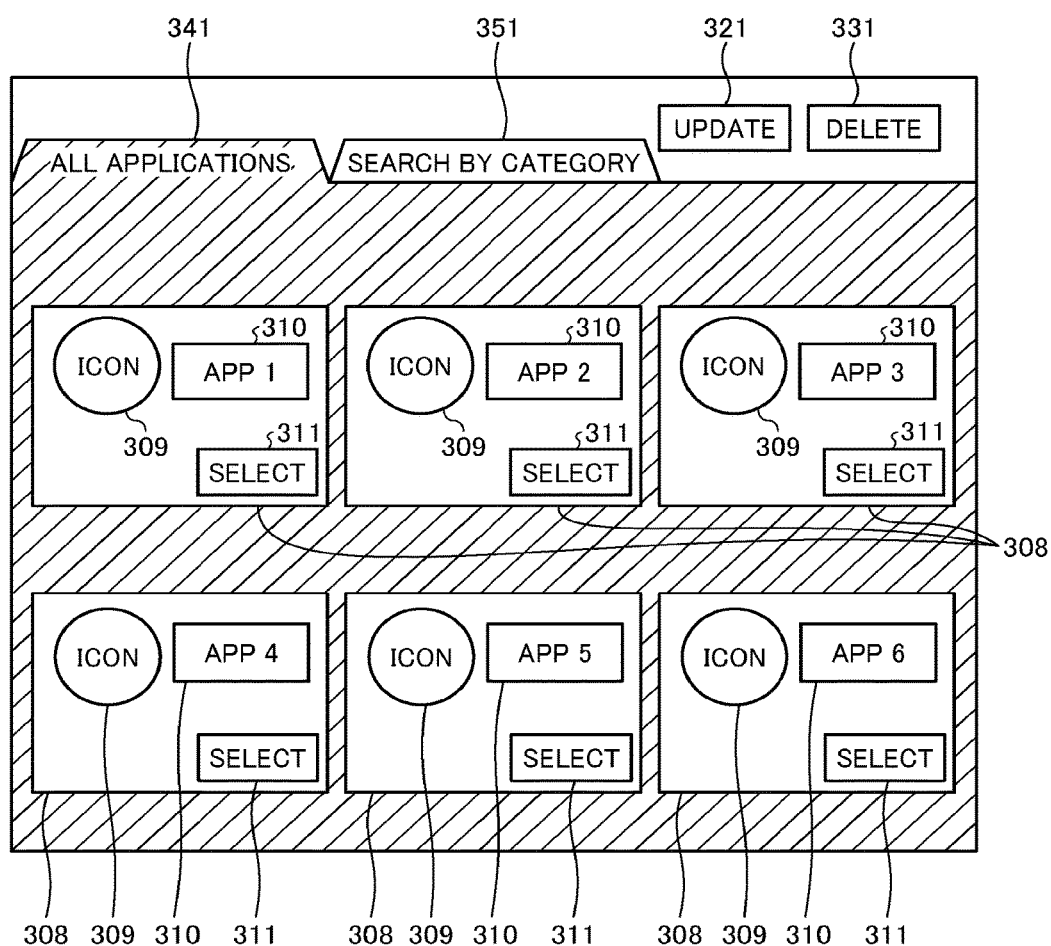
FIG. 25A is a diagram illustrating another example of the application list screen, according to an embodiment of the present disclosure.

FIG. 25A illustrates an example of the application list screen in which the background is automatically changed based on the device type. When "ON" (execution) is selected for the automatic background change, the background of the application list screen is changed to a background for the MFP in response to the screen information request from the MFP 4, as illustrated in FIG. 25A. In this example, the background of the application list screen is changed to "TILE (LIGHT BLUE)" in accordance with the settings as illustrated in FIG. 10.

As described above, the automatic change of the background is not limited to such automatic change of the screen background. In another example, a background of the application button 308 of a recommended application may be changed to a preset color depending on the device type.

Figure 25B:
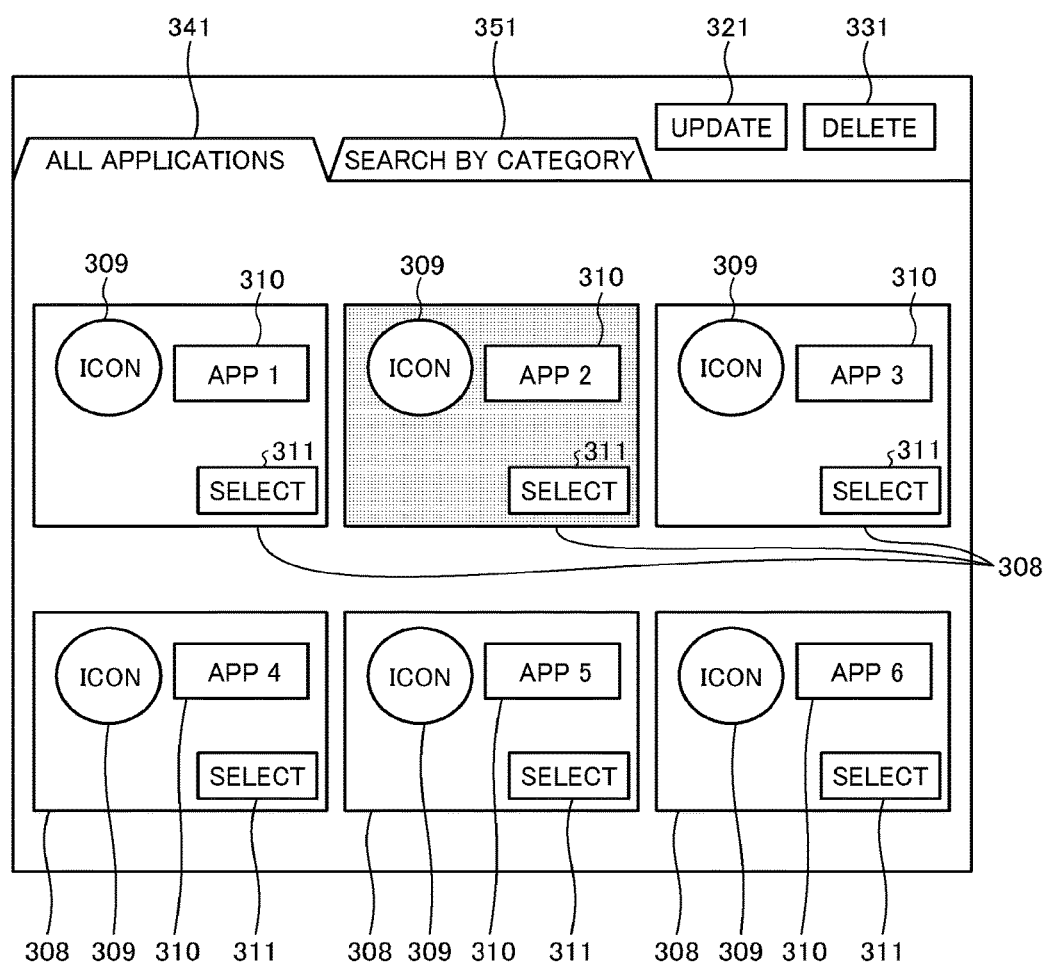
FIG. 25B is a diagram illustrating another example of the application list screen, according to an embodiment of the present disclosure.

FIG. 25B illustrates an example of the application list screen in which the background color of the application button 308 of a recommended application is automatically changed depending on the device type. When "ON" (execution) is selected for the automatic change, the background of the application button 308 of the recommended application is changed to "Red" in response to the screen information request from the MFP 4, as illustrated in FIG. 25B. Thus, if there is any application that is particularly recommended for the MFP, changing the background of the application button 308 to red enables a user to easily recognize such recommended application.

In addition, as described above, the automatic change of the screen background is just one example, and in another example, a color of the icon 309 inside the application button 308 may be changed to a preset color depending on the device type.

Figure 25C:
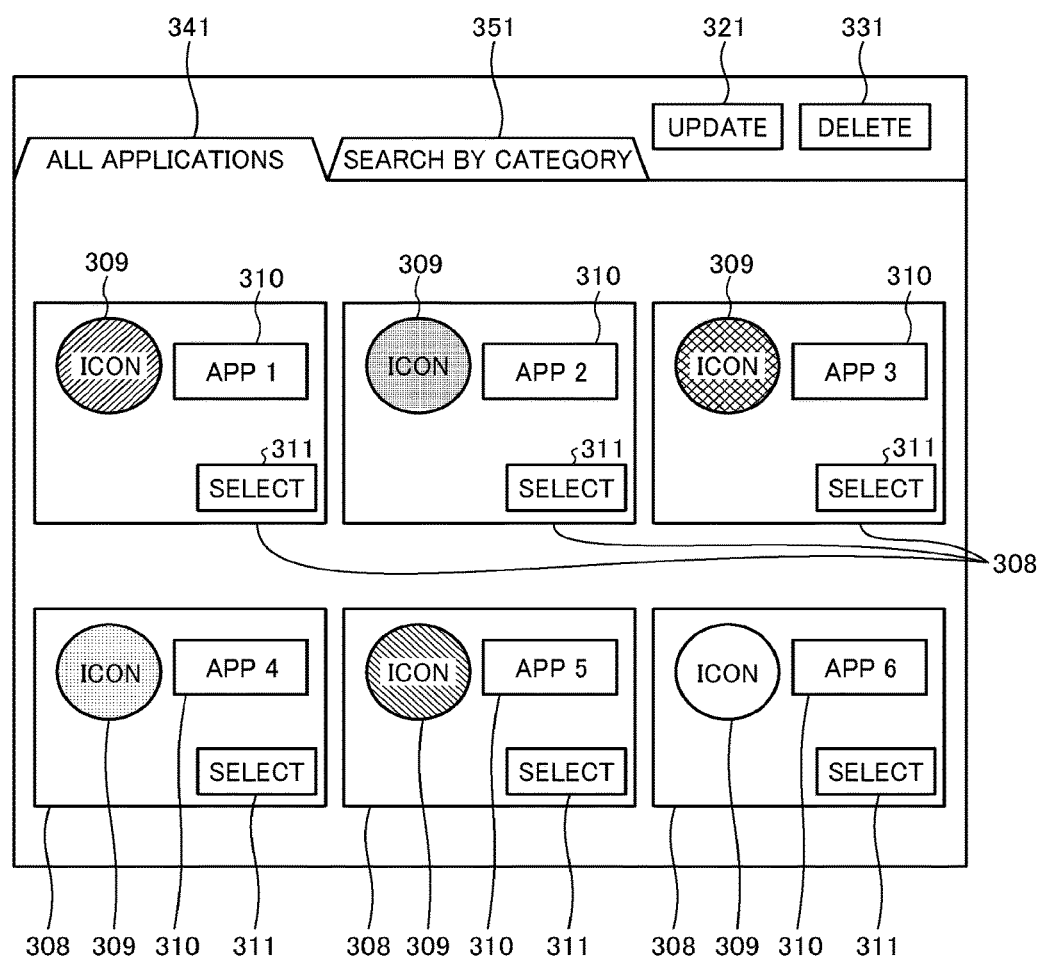
FIG. 25C is a diagram illustrating another example of the application list screen, according to an embodiment of the present disclosure.

FIG. 25C illustrates an example of the application list screen in which a color of the icon 309 inside the application button 308 is automatically changed based on the device type. When "ON" (execution) is selected for the automatic change, a color of the icon 309 inside the application button 308 of the application related to an MFP is changed to a preset color in response to the screen information request from the MFP 4, as illustrated in FIG. 25C.

Further, as described above, the background may be changed to a preset background depending on the attribute of a user who logs in to the MFP 4.

Figure 25D:
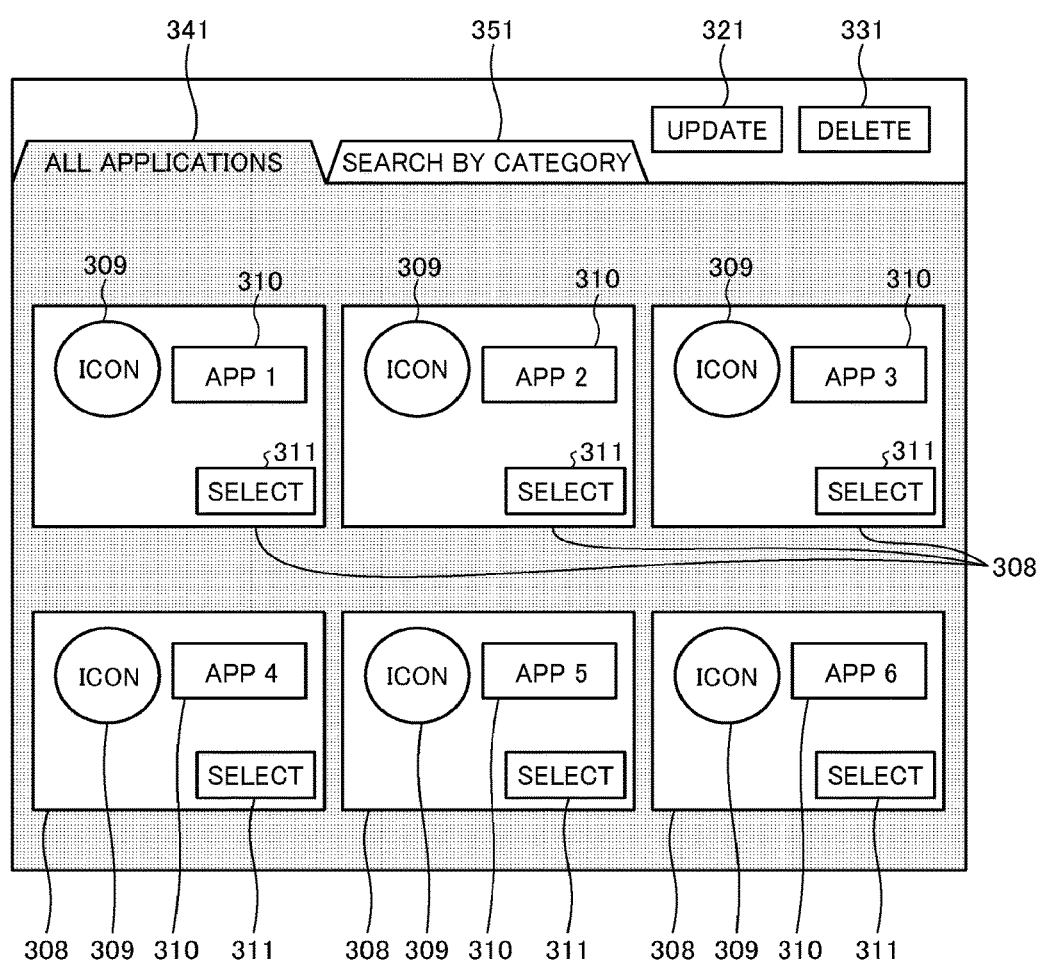
FIG. 25D is a diagram illustrating another example of the application list screen, according to an embodiment of the present disclosure.

FIG. 25D illustrates an example of the application list screen in which a color of the background is automatically changed based on the attribute of the user. When "ON" (execution) is selected for the automatic background change and the attribute of the user who logs in to the MFP 4 is "female", the background of the screen is changed to "SINGLE COLOR (PINK)", as illustrated in FIG. 25D.

Further, in the example of FIG. 24, the applications may be displayed by category on the application list screen. In the example of FIG. 24, the application list screen displays a tab 341 and a tab 351. In the tab 341, a list of all applications is displayed to receive selection of a desired application. In the tab 351, the applications are searched by category to receive a selection of a desired application.

Furthermore, as a result of the above operation, when the UI language of the application does not match the UI language of information displayed on the control panel 27 of the MFP 4, the display controller 262 performs control to display on the control panel 27 the application list screen displaying the application button 308 of an installable application including a warning X, as illustrated in FIG. 24, for example. In this example, the warning X included in the application button 308 is "NOT SUPPORT JAPANESE", when the UI language of information displayed on the control panel 27 of the MFP 4 is "ui_japanese".

By contrast, when the UI language of the application matches the UI language of information displayed on the control panel 27 of the MFP 4, the display controller 262 performs control to display on the control panel 27 the application list screen displaying the application button 308 of the installable application not including the warning X, as illustrated in FIG. 24, for example.

Further, when the peripheral device of the application acquired from the application list is a device connectable to the MFP 4 referring to the peripheral device management unit 110, the display controller 262 performs control to display on the control panel 27 the application list screen displaying the application button 308 of the installable application including the warning X, as illustrated in FIG. 24, for example. In this example, when the peripheral device connectable to the control panel 27 of the MFP 4 is "camera", the warning X included in the application button 308 is "CAMERA APP".

By contrast, when the peripheral device of the application acquired from the application list is a device unconnectable to the MFP 4 referring to the peripheral device management unit 110, the display controller 262 performs control to display on the control panel 27 the application list screen in which the application button 308 of the corresponding application is not included.

Figure 26:
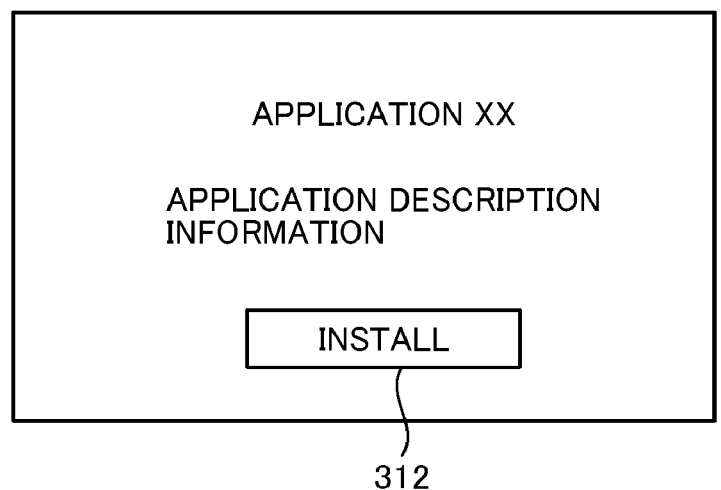
FIG. 26 is a diagram illustrating an example of an installation instruction screen, according to an embodiment of the present disclosure.

In response to receiving the pressing of any one of the application selection buttons 311, the display controller 262 performs control to display on the control panel 27 an installation instruction screen using the display information received from the server 2. The installation instruction screen is a screen that displays information indicating detailed contents of the corresponding application and accepts an installation execution instruction. FIG. 26 illustrates an example of the installation instruction screen. In the example of FIG. 26, the installation instruction screen displays the application description information of the corresponding application and an install button 312 that receives an instruction for executing an installation. In this example, pressing of the install button 312 means selection of the installation instruction. In other words, pressing of the install button 312 means a selection of an application that a user wants to install.

Figure 27:
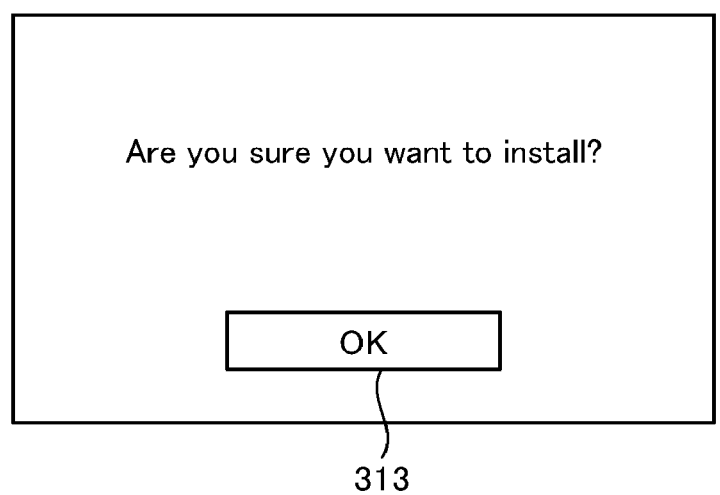
FIG. 27 is a diagram illustrating an example of an installation confirmation screen.

In this example, in response to receiving the pressing of the install button 312, the display controller 262 performs control to display on the control panel 27 an installation confirmation screen that enables a user to confirm the execution of installation. FIG. 27 illustrates an example of the installation confirmation screen. In the example of FIG. 27, the installation confirmation screen displays a confirmation button 313 that receives an instruction for approving the execution of the installation. In this example, the installation instruction in the JavaScript format is included in the confirmation button 313. In response to receiving the pressing of the confirmation button 313, the execution unit 263 notifies the processing executing unit 264 of the installation instruction included the pressed confirmation button 313. The processing executing unit 264 executes this installation instruction.

Each of the above described functions of the activation unit 261, the display controller 262, the execution unit 263, and the processing executing unit 264 is implemented by the CPU 21 executing a program stored in a storage device such as the ROM 22 or the flash memory 24.

Figure 28:
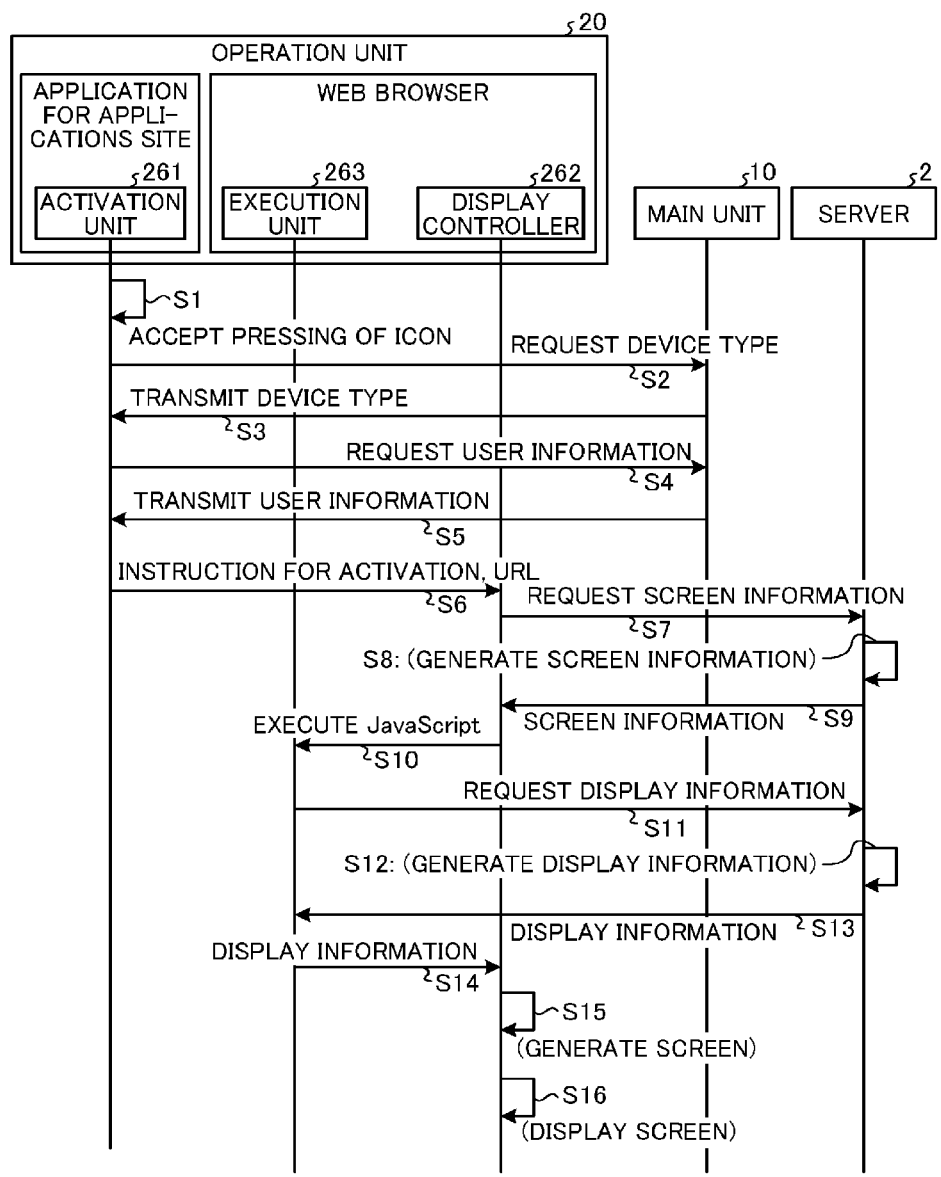
FIG. 28 is a sequence diagram illustrating an example of an operation by the system, according to an embodiment of the present disclosure.

FIG. 28 is a sequence diagram illustrating an example of an operation procedure by the system 1.

In this embodiment, it is assumed that the following settings are configured.

Automatic change of the background depending on device types: On

Automatic sorting of the application list depending on device types: On

Automatic change of the background depending on login users: Off

As described above, in response to receiving the pressing of the icon 50 named "Application Market" on the operation screen (step Si), the activation unit 261 of the application for the application site requests the main unit 10 of the MFP 4 to transmit the model code (device type) identifying the MFP 4 (step S2).

The main unit 10 of the MFP 4 transmits the model code (device type) identifying the model of the MFP 4 to the activation unit 261 of the application for the application site of the operation unit 20 (step S3).

Further, the activation unit 261 of the application for the application site requests the main unit 10 of the MFP 4 to transmit information indicating a user who currently logs in to the MFP 4 (step S4).

The main unit 10 of the MFP 4 transmits the information indicating the user who currently logs in to the MFP 4 to the activation unit 261 of the application for the application site of the operation unit 20 (step S5).

Next, the activation unit 261 of the application for the application site starts up a browser application that implements a web browser function. More specifically, the activation unit 261 of the application for the application site transmits an URL of the server 2 together with an activation command to the browser application (the display controller 262 and the execution unit 263), which is a web browser (step S6). The browser application (display controller 262) that is activated in response to the activation command transmits the above-described screen information request as an HTTP request to the server 2 specified by the received URL (step S7). The screen information request transmitted at step S7 includes the model code (device type) and the attribute of the user.

Next, the server 2 generates web content data (screen information) including the selection of the background depending on the model code (device type) and the attribute of the user transmitted from the MFP 4 (step S8). Further, the server 2 transmits the generated web content data (screen information) to the MFP 4 as an HTTP response (step S9). The browser application (display controller 262) receives the web content data (screen information) as a response to the screen information request, which is the HTTP request.

For example, the browser application (display controller 262) receives HTML, and CSS or JavaScript included in the HTML (or referred to from the HTML) as the web content data (screen information). When the browser application (display controller 262) loads JavaScript or a link to JavaScript included in the HTML, to cause the execution unit 263 to execute the JavaScript (step S10).

Figure 29:
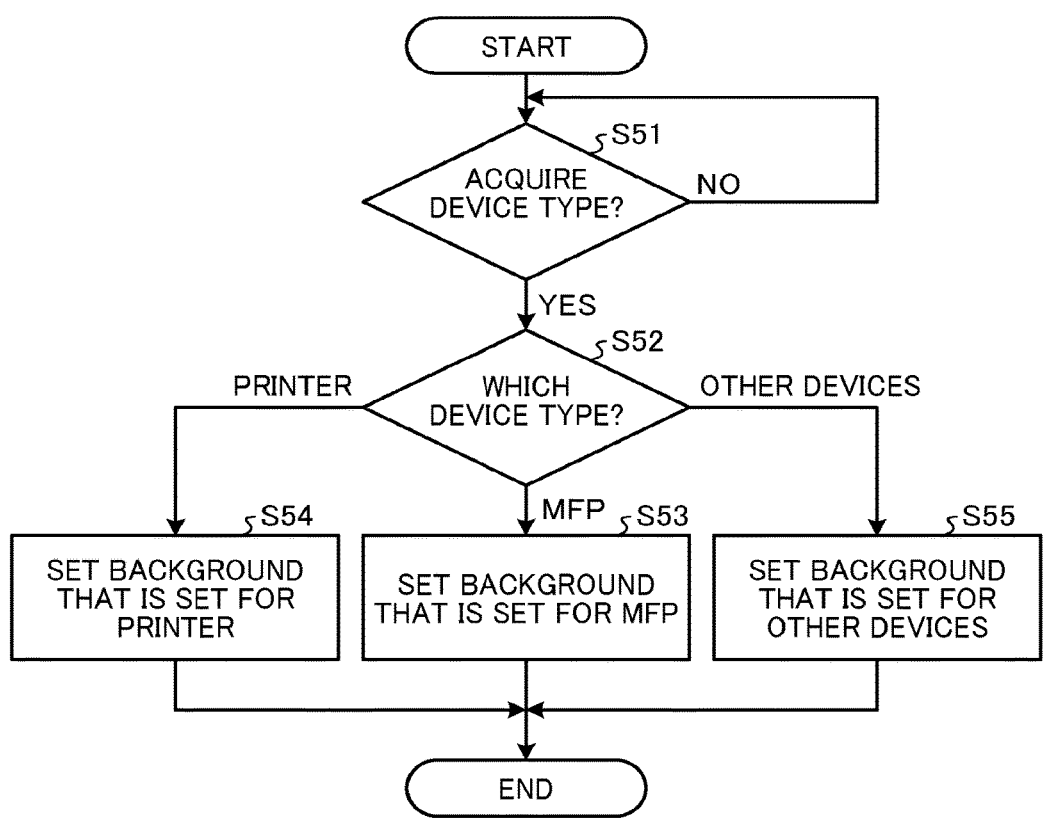
FIG. 29 is a flowchart illustrating a flow of an operation of selecting a background of a button displayed on the application list screen, according to an embodiment of the present disclosure.

Hereinafter, a description is given of an operation, performed at the above-described step S8, for selecting a background of the buttons displayed on the application list screen as the web content data (screen information). FIG. 29 is a flowchart illustrating a flow of the operation of selecting a background of the button displayed on the application list screen.

As illustrated in FIG. 29, in response to obtaining the model code (device type) transmitted from the MFP 4 (step S51: YES), the server 2 identifies a model or device type indicated by the received model code (device type) (step S52).

When the server 2 determines that the model code (device type) transmitted from the MFP 4 indicates an MFP (step S52: MFP), the server 2 sets a background set for an MFP as the background (step S53).

By contrast, when the server 2 determines that the model code (device type) transmitted from the MFP 4 indicates a printer (step S52: Printer), the server 2 sets a background set for a printer as the background (step S54). Further, when the server 2 determines that the model code (device type) transmitted from the MFP 4 indicates other devices (step S52; other devices), the server 2 sets a background set for the other device as the background (step S55).

Referring again to FIG. 28, the browser application (the execution unit 263) interprets and executes the JavaScript, and transmits the above-described display information request as an HTTP request to the server 2 using Ajax. The display information request to be transmitted is, for example, an application list request including the model code (device type) and the user's attribute (step S11).

The server 2 performs generation of the display information including sorting of applications based on the model code (device type) (step S12). Further, the server 2 transmits the generated web content data (display information) to the MFP 4 as an HTTP response (step S13). The browser application (execution unit 263) receives the web content data (display information) as a response to the display information request, which is the HTTP request.

Figure 30:
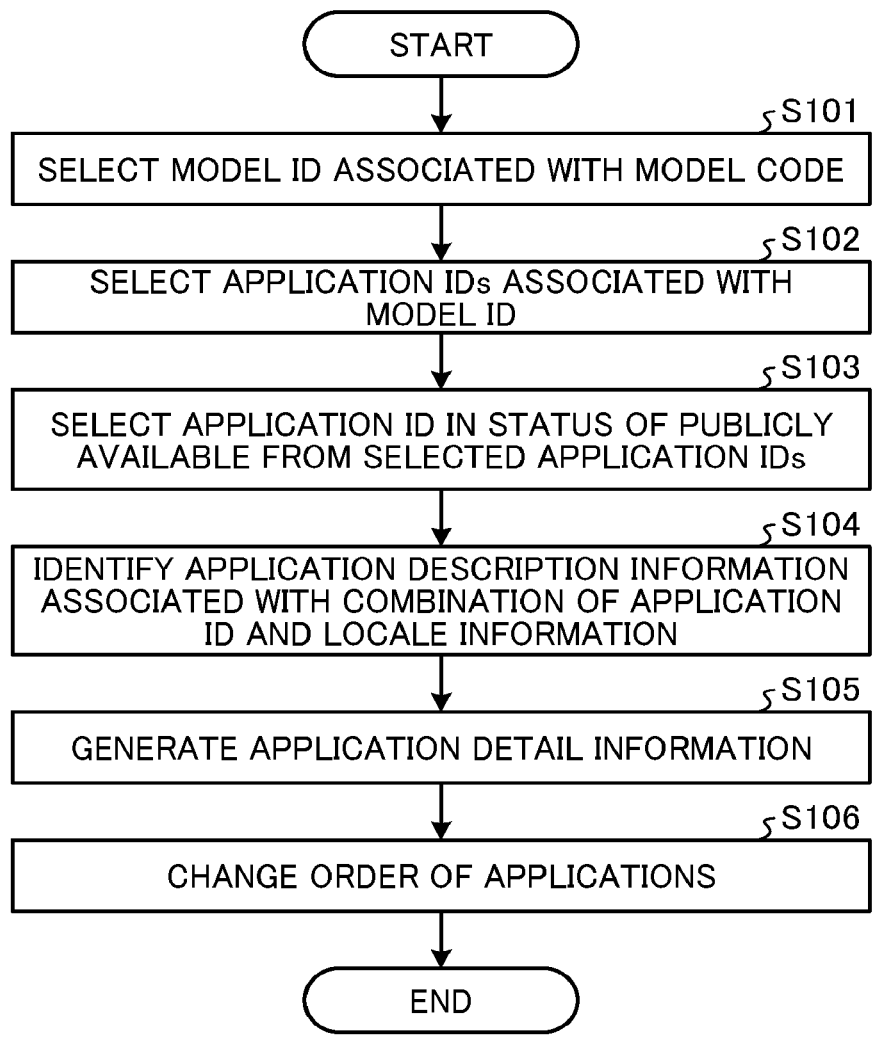
FIG. 30 is a flowchart illustrating an example of an operation by the server, according to an embodiment of the present disclosure.

FIG. 30 is a flowchart illustrating an example of an operation, performed at the above-described step S12 by the server 2, of generating, for each of the applications usable at the MFP 4, application detail information that associates the application with detailed information indicating details of the application. As illustrated in FIG. 30, in response to receiving the display information request from the MFP 4, the identifying unit 216 refers to the first correspondence information as illustrated in FIG. 5, to select the model ID associated with the model code included in the received display information request (step S101).

Next, the identifying unit 216 refers to the second correspondence information as illustrated in FIG. 6, to select one or more application IDs and required hardware associated with the selected model ID (step S102). Next, the identifying unit 216 refers to the third correspondence information as illustrated in FIG. 7, to select, from among the selected one or more application IDs, one or more application IDs associated with the status information indicating the application is publicly available (step S103). At step S103, the identifying unit 216 also identifies the version information associated with the one or more application IDs selected in step S103 in the second correspondence information as illustrated in FIG. 6. Next, the identifying unit 216 refers to the fourth correspondence information as illustrated in FIG. 8, to identify the application description information associated with the combination of each of the application IDs selected at step S103 and the language information (locale information) included in the display information request received from the MFP 4 (step S104).

Then, the display information generator 217 can generates, for each of the application IDs selected in step S103, application detail information (step S105), by associating the application description information identified at step S104 with the detailed information including the version information associated with each of the application IDs selected at S103 from among the second correspondence information illustrated in FIG. 6.

Further, the display information generator 217 sorts (rearranges) the applications based on the model code (device type) (step S106).

Referring again to FIG. 28, the execution unit 263 transfers the received web content data (display information) to the display controller 262 (step S14). The browser application (display controller 262) generates the application list screen configured based on the web content data (screen information and display information) received from the execution unit 263 (step S15). Further, the browser application (display controller 262) displays the generated application list screen on the control panel 27 (step S16). In this example, the display controller 262 stores the web content data (the screen information and the display information) received by the execution unit 263 from the server 2 in a storage device such as the flash memory 24. Further, the display controller 262 first generates the application list screen as illustrated in FIG. 24 using the received web content data (the screen information and the display information). Then, the display controller 262 performs control to display the generated application list screen on the control panel 27.

Figure 31:
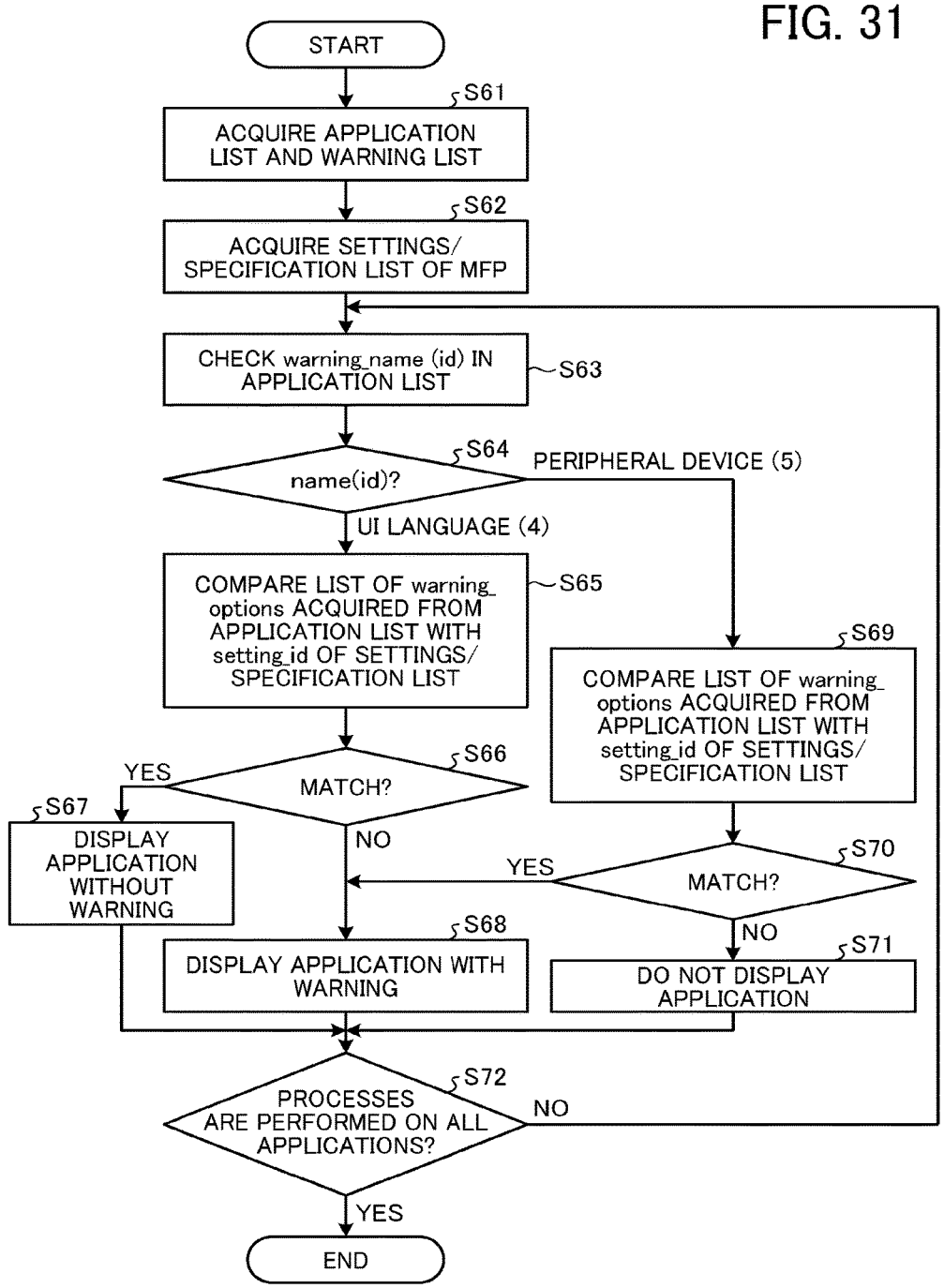
FIG. 31 is a flowchart illustrating a flow of an operation of generating a button to be displayed on the application list screen, according to an embodiment of the present disclosure.

Next, a description is given of an operation, performed at the above-described step S15, for generating a button to be displayed on the application list screen. FIG. 31 is a flowchart illustrating a flow of the operation of generating the button to be displayed on the application list screen.

The browser application (execution unit 263) obtains the application list (see FIGS. 21A and 21B) and the warning list (see FIG. 22) as a response from the server 2 (step S61).

Further, the browser application (execution unit 263) obtains the settings/specification list (see FIG. 23) of the MFP 4 from the main unit 10 (step S62).

Next, the browser application (the display controller 262) checks the warning_name (id) in the application list (step S63).

When the warning_name (id) is "UI language" (step S64: UI language), the browser application (display controller 262) compares a list of warning_options of the application acquired from the application list with the setting_id in the settings/specification list (step S65).

When the browser application (display controller 262) determines that the list of warning_options matches the setting_id in the settings/specification list (step S66: YES), the browser application (display controller 262) displays the button of the installable application, the button not including a warning (step S67).

When the browser application (display controller 262) determines that the list of warning_options does not match the setting id in the settings/specification list (step S66: NO), the browser application (display controller 262) displays the button of the installable application, the button including a warning (step S68).

By contrast, when the warning_name (id) is "peripheral device" (step S64: peripheral device), the browser application (display controller 262) compares the list of warning_options of the application acquired from the application list with the setting_id in the settings/specification list (step S69).

When the browser application (display controller 262) determines that the list of warning_options matches the setting_id in the settings/specification list (step S70: YES), the browser application (display controller 262) displays the button of the installable application, the button including a warning (step S68).

When the browser application (display controller 262) determines that the list of warning_options does not match the setting_id in the settings/specification list (step S70: NO), the browser application (display controller 262) does not display the button of the corresponding application (step S71).

When the browser application (display controller 262) determines that the above-described steps S63 to S71 are performed for all the applications (step S72: YES), the operation ends.

Figure 32:
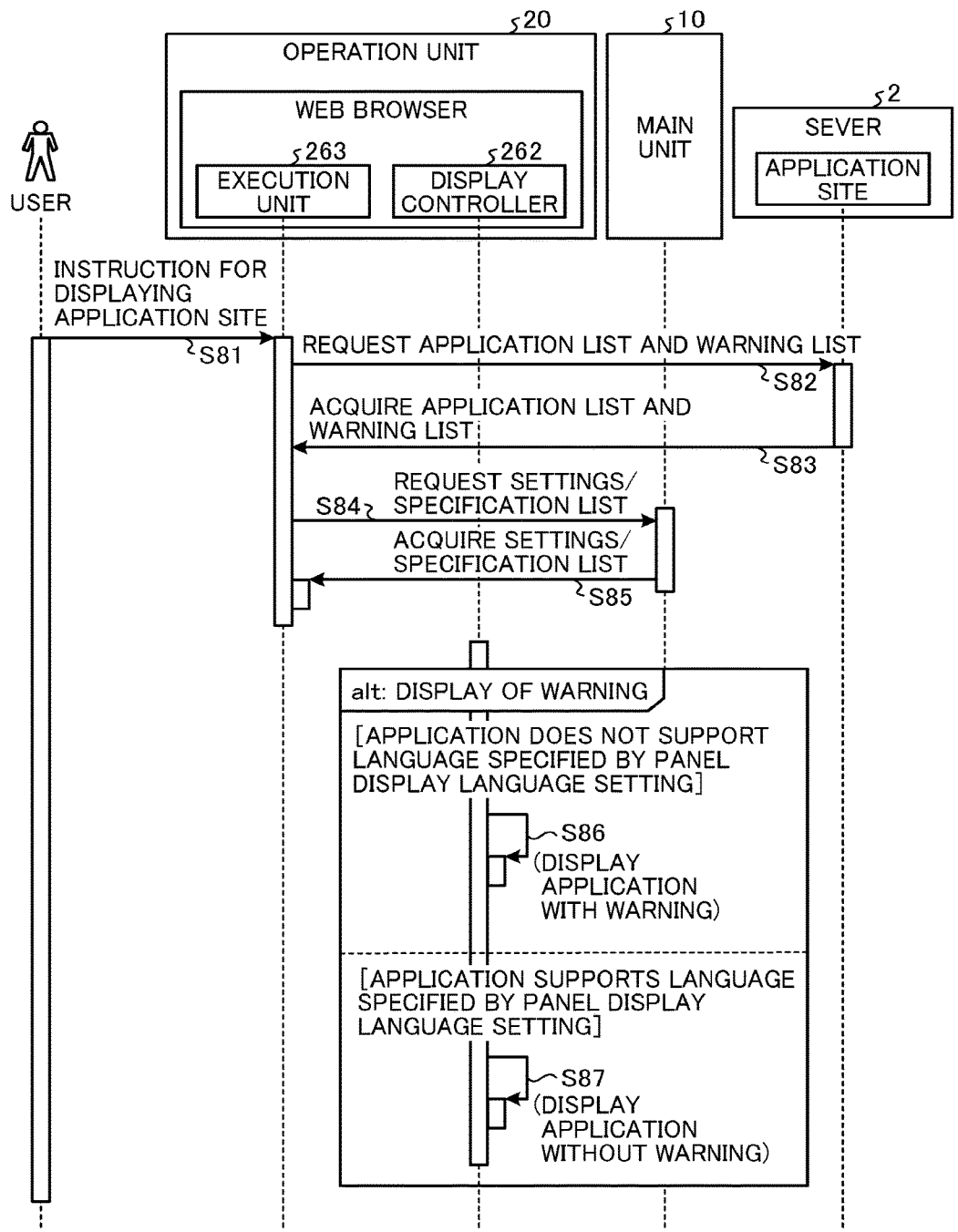
FIG. 32 is a sequence diagram illustrating an operation of displaying an application button, with respect to a user interface (UT) language, according to an embodiment of the present disclosure.

FIG. 32 is a sequence diagram illustrating an operation of displaying the application button, with respect to the UI language. As illustrated in FIG. 32, in response to receiving selection (pressing) of the icon 50 named "Application Market" in a state where an operation screen as illustrated in FIG. 20 is displayed on the control panel 27 (step S81), the browser application (execution unit 263) requests the application list (see FIGS. 21A and 21B) and the warning list (see FIG. 22) from the server 2, which is the application site (step S82).

The browser application (execution unit 263) obtains the application list (see FIGS. 21A and 21B) and the warning list (see FIG. 22) as a response from the server 2 (step S83).

Further, the browser application (execution unit 263) requests the settings/specification list (see FIG. 23) of the MFP 4 from the main unit 10 (step S84).

The browser application (execution unit 263) obtains the settings/specification list (see FIG. 23) as a response from the main unit 10 (step S85).

Next, when the application does not support a language of a panel display language setting, the browser application (display controller 262) displays the button of the installable application including a warning (step S86).

By contrast, when the application supports the language of the panel display language setting, the browser application (display controller 262) displays the button of the installable application that does not include a warning (step S87).

Figure 33:
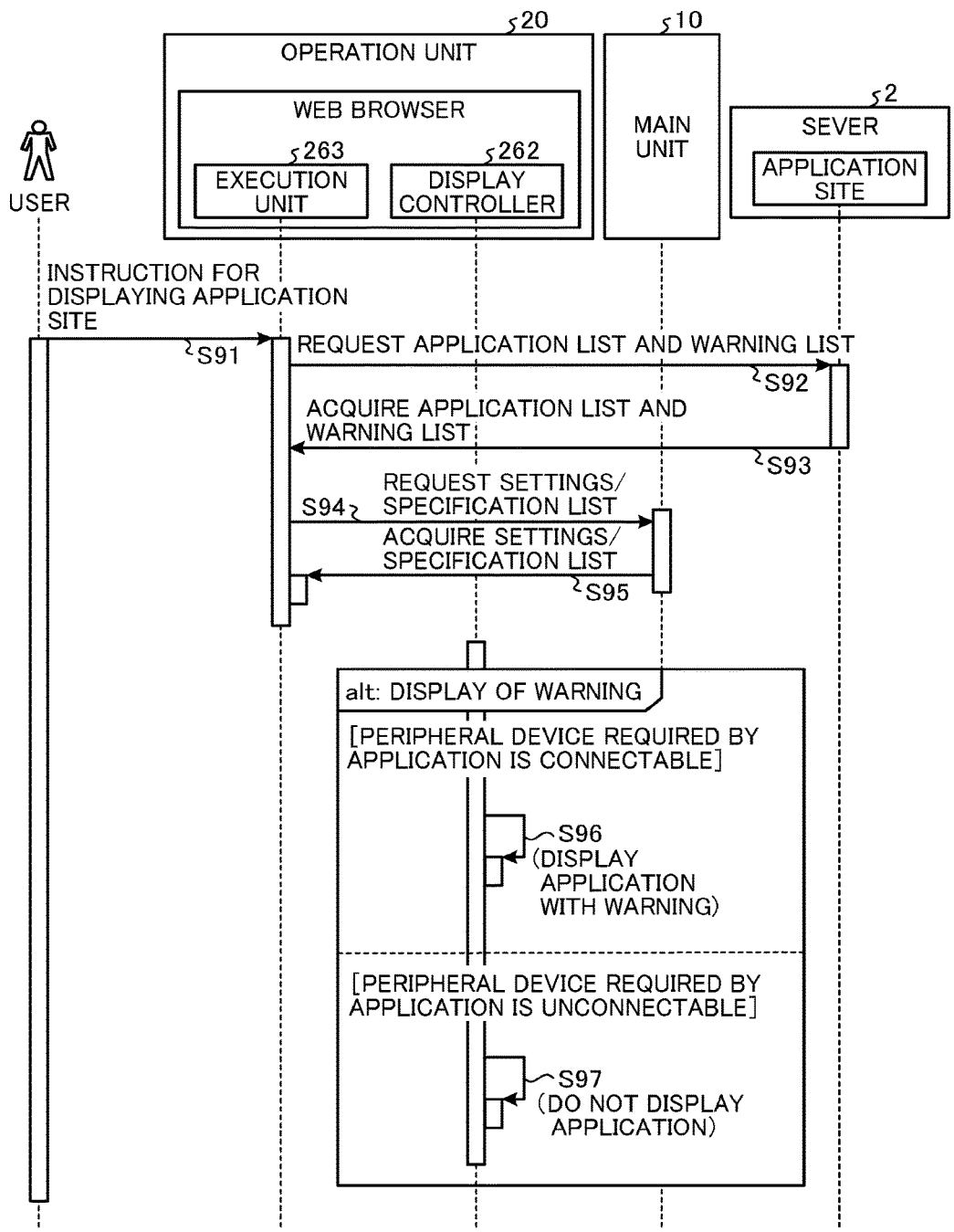
FIG. 33 is a sequence diagram illustrating an operation of displaying the application button of an application that requires a peripheral device, according to an embodiment of the present disclosure.

FIG. 33 is a sequence diagram illustrating an operation of displaying the application button of an application that requires a peripheral device. As illustrated in FIG. 33, in response to receiving selection (pressing) of the icon 50 named "Application Market" in a state where an operation screen as illustrated in FIG. 20 is displayed on the control panel 27 (step S91), the browser application (execution unit 263) requests the application list (see FIGS. 21A and 21B) and the warning list (see FIG. 22) from the server 2, which is the application site (step S92).

The browser application (execution unit 263) obtains the application list (see FIGS. 21A and 21B) and the warning list (see FIG. 22) as a response from the server 2 (step S93).

Further, the browser application (execution unit 263) requests the settings/specification list (see FIG. 23) of the MFP 4 from the main unit 10 (step S94).

The browser application (execution unit 263) obtains the settings/specification list (see FIG. 23) as a response from the main unit 10 (step S95).

Next, when a peripheral device required for the application is a device connectable to the MFP 4, the browser application (display controller 262) displays the button of the installable application, the button including a warning (step S96).

By contrast, when a peripheral device required for the application is a device unconnectable to the MFP 4, the browser application (display controller 262) does not display the button of the application (step S97).

According to a known technology, an application installable from a website is installed to the MFP 4, even when operability of the application is not good depending on the settings or specifications of the MFP 4 or even when the application requires the specific use of the settings or specifications of the MFP 4, since there is no way for a user to recognize such uneasy user operability or specific requirement. This causes inconveniences when using the installed application.

Therefore, in the present embodiment, a warning about an application function is dynamically displayed for enabling a user to recognize an application that is uneasy to operate depending on the settings or specifications of the MFP 4 or requires specific use of the settings or specifications of the MFP 4.

As a result, in a case where there is an application whose operability is not good or an application having a function that is not supported by a target device such as the MFP 4, it becomes easier for a user to find an application that need the user's needs, by generating and displaying warnings dynamically.

For example, it is assumed that there is an application that does not support a panel display language (e.g., the user's native language) set for the control panel 27 of the MFP 4. If such application is additionally installed in the MFP 4, a user is required to use the application in a language other than the user's native language. As a result, operability for a user degrades. By contrast, if the user can recognize in advance that the application does not support the user's native language, operability for a user is improved.

Further, for example, it is assumed that there is an application that utilizes a camera connected to the MFP 4. If such application is additionally installed in the MFP 4 in a state in which no camera is connected to the MFP 4, it means that an application that is not usable at the MFP 4 is installed. This degrades operability of the MFP 4. By contrast, if a user recognizes in advance that the application requires a camera, the user can take measures such as refraining from installing such application or preparing a camera. This improves operability for a user.

It is expected that various peripheral devices will be connected to the MFP 4 in the future, and accordingly the number of applications utilizing the peripheral devices will increase. The more specialized a peripheral device, the more specialized a function provided by the application. Making it easier for a user to find such application may be beneficial for the user.

Supplementary Description: An image processing apparatus communicable with a server distributing one or more applications via a network, the apparatus including a browser for browsing a site of the server from which site the apparatus obtains at least one application, the apparatus comprising:

an execution unit for executing an application command for acquiring at least one of information relating to a usable application and information relating to a setting or a specification of the image processing apparatus, the execution unit being provided at the browser; and a display control unit for displaying a warning about an application function of the usable application based on information relating to at least one of the setting and the specification of the image processing apparatus, the display control unit being provided at the browser.

Figure 34:
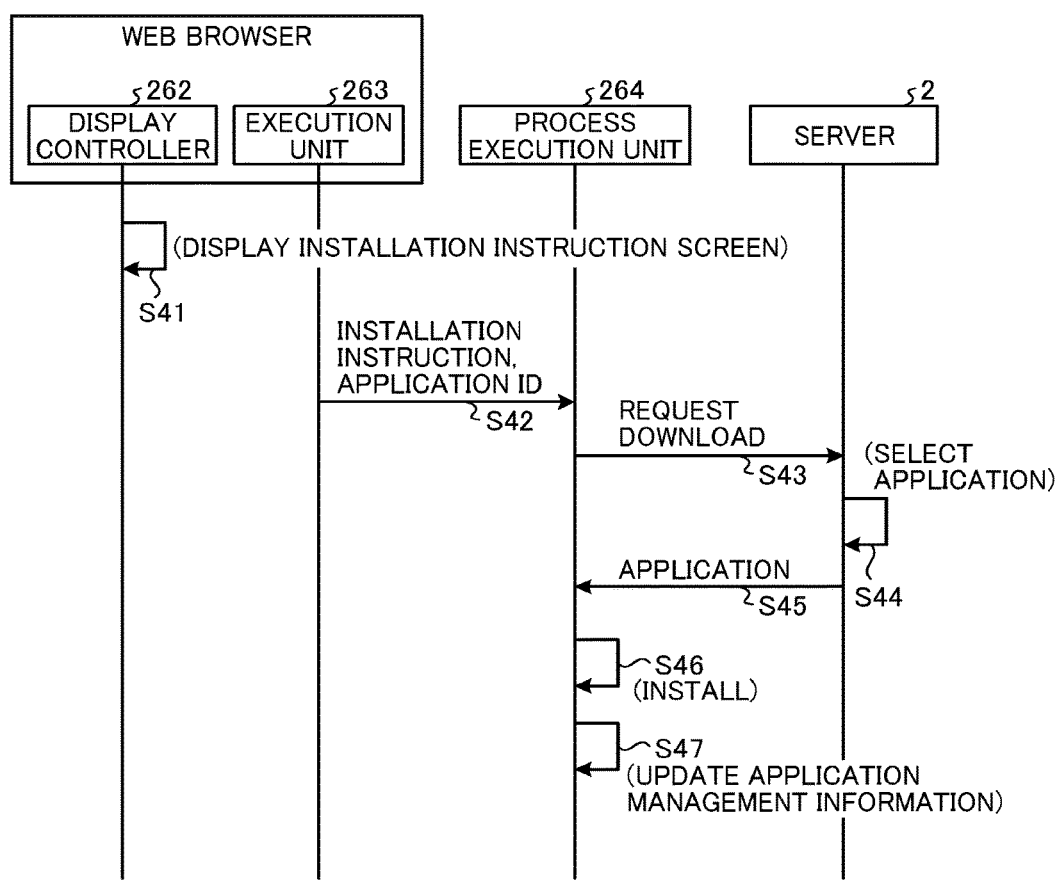
FIG. 34 is a sequence diagram illustrating an example of an operation order in the system, according to an embodiment of the present disclosure.

FIG. 34 is a sequence diagram illustrating an example of an operation procedure by the system 1 when any one of the application selection buttons 311 displayed on the application list screen illustrated in FIG. 24 is pressed. As described above, in response to receiving the pressing of any one of the application selection buttons 311, the display controller 262 performs control to display the installation instruction screen (see FIG. 26) and the installation confirmation screen (see FIG. 27) on the control panel 27 (step S41).

Next, in response to the pressing of the install button 312, the execution unit 263 notifies the processing executing unit 264 of the installation instruction selected in response to the user's operation and the application ID (the application ID of the application as a target of the selected application instruction) (step S42). The processing executing unit 264 executes the installation instruction notified from the execution unit 263. The more specific description is given hereinafter. First, the processing executing unit 264 transmits, to the server 2, the above-described download request including at least the application ID of the application as the target of the installation instruction and requesting download of the application (step S43). In response to receiving the download request, the server 2 (the download unit 232) selects an application corresponding to the application ID included in the received download request (step S44). Further, the server 2 (the download unit 232) transmits the selected application to the MFP 4 (step S45).

The MFP 4 (the processing executing unit 264) performs control to install the application downloaded from the server 2 in step S45 (step S46). After the installation is completed, the processing executing unit 264 stores, in the above-described application management information (the second correspondence information as illustrated in FIG. 6), the application ID of the installed application in association with a version of the installed application at the time of installation. Thus, the processing executing unit 264 updates the application management information (the second correspondence information as illustrated in FIG. 6) (step S47).

As described heretofore, according to the server 2 of the present embodiment, a globally-common UI design such as a screen background of an application site is changed depending devices such as an MFP or a printer accessing the application site or depending on users logging in to such device. This improves operability of the device, and it becomes easier to use the device.

According to an embodiment of the present disclosure, a screen background of an application site displayed on an image forming apparatus can be changed depending on peripheral devices connected to the image forming apparatus, preferences of a user, an application utilization status, etc.

According to an embodiment of the present disclosure, operability of an image processing apparatus accessing an application site is improved, and it becomes easier to use the image processing apparatus.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. For example, some of the elements described in the above embodiments may be removed.

In addition, although in the above-described embodiment, the main unit 10 and the operation unit 20 operate independently with each other on separate operating systems, in another example, the main unit 10 and the operation unit 20 may operate on the same operating system. In other words, the main unit 10 and the operation unit 20 may be configured as a single integrated unit.

A program executed by the system 1 (the server 2, the MFP 4, etc.) according to the above-described embodiment may be stored in any desired computer-readable storage medium such as a compact disc read-only memory (CD-ROM), a flexible disk (FD), a compact disc-recordable (CD-R), and a digital versatile disk (DVD), a universal serial bus (USB) in an installable or executable file format, for distribution. Further, the program executed by the system 1 according to the above-described embodiment may be provided or distributed via a network such as the Internet. Furthermore, various kinds of programs executable by the system 1 according to the above-described embodiment may be provided as being preloaded in a ROM and the like.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A system comprising:
a server configured to distribute one or more applications; and
an image processing apparatus communicable with the server via a network, the image processing apparatus including a browser,
wherein
the server comprises circuitry to:
receive information relating to a device type of the image processing apparatus from the image processing apparatus;
based on the received information relating to the device type, change a part of a screen design relating to an application list screen displaying the one or more applications distributable to the image processing apparatus on the browser of the image processing apparatus; and
transmit, to the image processing apparatus, information relating to the application list screen in which the part of the screen design is changed based on the information relating to the device type, and wherein
the browser of the image processing apparatus is configured to:
execute an application command for transmitting the information relating to the device type of the image processing apparatus to the server; and
display the application list screen in which the part of the screen design is changed based on the information relating to the device type.

2. The system of claim 1, wherein
the part of the screen design relating to the application list screen changed by the circuitry is a background of the application list screen.

3. The system of claim 1,
wherein the part of the screen design relating to the application list screen changed by the circuitry is a background of an area indicating a specific one of the one or more applications.

4. The system of claim 1, wherein
the part of the screen design relating to the application list screen changed by the circuitry is an icon of a specific one of the one or more applications.

5. The system of claim 1, wherein
the part of the screen design relating to the application list screen changed by the circuitry is a display order of the one or more applications.

6. The system of claim 5, wherein
the display order of the one or more applications is changed according to a download ranking of the one or more applications for each device type of the image processing apparatus.

7. A system comprising:
a server configured to distribute one or more applications; and
an image processing apparatus communicable with the server via a network, the image processing apparatus including a browser,
wherein
the server comprises circuitry to:
receive, from the image processing apparatus, information relating to a user who logs in to the image processing apparatus;
based on the received information relating to the user, change a part of a screen design relating to an application list screen displaying the one or more applications distributable to the image processing apparatus on the browser of the image processing apparatus; and
transmit, to the image processing apparatus, information relating to the application list screen in which the part of the screen design is changed based on the information relating to the user, and
wherein
the browser of the image processing apparatus is configured to:
execute an application command for transmitting the information relating to the user who logs in to the image processing apparatus to the server; and
display the application list screen in which the part of the screen design is changed based on the information relating to the user.

8. The system of claim 7, wherein
the part of the screen design relating to the application list screen changed by the circuitry is a background of the application list screen.

9. The system of claim 7,
wherein the part of the screen design relating to the application list screen changed by the circuitry is a background of an area indicating a specific one of the one or more applications.

10. The system of claim 7, wherein
the part of the screen design relating to the application list screen changed by the circuitry is an icon of a specific one of the one or more applications.

11. The system of claim 7, wherein
the part of the screen design relating to the application list screen changed by the circuitry is a display order of the one or more applications.

12. The system of claim 11, wherein
the display order of the one or more applications is changed according to a download ranking of the one or more applications for each device type of the image processing apparatus.

* * * * *